(12) United States Patent
Matsumoto et al.

(10) Patent No.: US 7,337,055 B2
(45) Date of Patent: Feb. 26, 2008

(54) ADAPTIVE CRUISE CONTROL SYSTEM FOR AUTOMOTIVE VEHICLE

(75) Inventors: Shinji Matsumoto, Kanagawa (JP);
Satoshi Tange, Kanagawa (JP);
Tatsuya Suzuki, Kanagawa (JP);
Hiroyuki Yoshizawa, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 475 days.

(21) Appl. No.: 11/111,766

(22) Filed: Apr. 22, 2005

(65) Prior Publication Data
US 2005/0240334 A1    Oct. 27, 2005

(30) Foreign Application Priority Data
Apr. 23, 2004    (JP) .............................. 2004-128340

(51) Int. Cl.
*B60T 8/32* (2006.01)
(52) U.S. Cl. .................. 701/93; 701/213; 340/905; 455/450
(58) Field of Classification Search ................ 701/93, 701/96, 218, 213, 208; 340/905, 332, 932, 340/933, 934; 455/450
See application file for complete search history.

(56) References Cited

U.S. PATENT DOCUMENTS

| 5,315,295 | A |   | 5/1994 | Fujii |
| 5,673,039 | A | * | 9/1997 | Pietzsch et al. ............. 340/905 |
| 2005/0251335 | A1 | * | 11/2005 | Ibrahim ..................... 701/213 |
| 2007/0087756 | A1 | * | 4/2007 | Hoffberg .................... 455/450 |

FOREIGN PATENT DOCUMENTS

| GB |   | 2413884 | * | 9/2005 |
| JP |   | 04-236699 | A | 8/1992 |
| JP |   | 08-194891 | A | 7/1996 |
| JP |   | 11-328592 | A | 11/1999 |
| JP |   | 2003-51100 | A | 2/2003 |

OTHER PUBLICATIONS

Goto et al. The CMU system for mobile robot navigation, 1987, IEEE, p. 99-105.*
Penton et al., On the steereing of automated vehicles: Theory and experiment, 1976, IEEE, p. 306-315.*

* cited by examiner

*Primary Examiner*—Thomas Black
*Assistant Examiner*—McDieunel Marc
(74) *Attorney, Agent, or Firm*—Foley & Lardner LLP

(57) ABSTRACT

An adaptive control system for an automotive vehicle, which warns of a driver and/or reduces the vehicle speed in consideration of a future trajectory. Receiving from a navigation system node information about nodes within a preview section, a control unit calculates a path radius at each of the nodes within the preview section, and identifies curve sections in accordance with the path radius of the preview section. Subsequently, the control unit estimates a lateral acceleration based on the current vehicle speed and the path radius. Subsequently, the control unit determines an estimated total driver load in accordance with the estimated lateral acceleration. Subsequently, the control unit determines a reference total driver load which is applied to the driver during the host vehicle traveling at an allowable cornering speed. Subsequently, the control unit calculates a driver load deviation between the estimated total driver load and the reference total driver load.

27 Claims, 10 Drawing Sheets

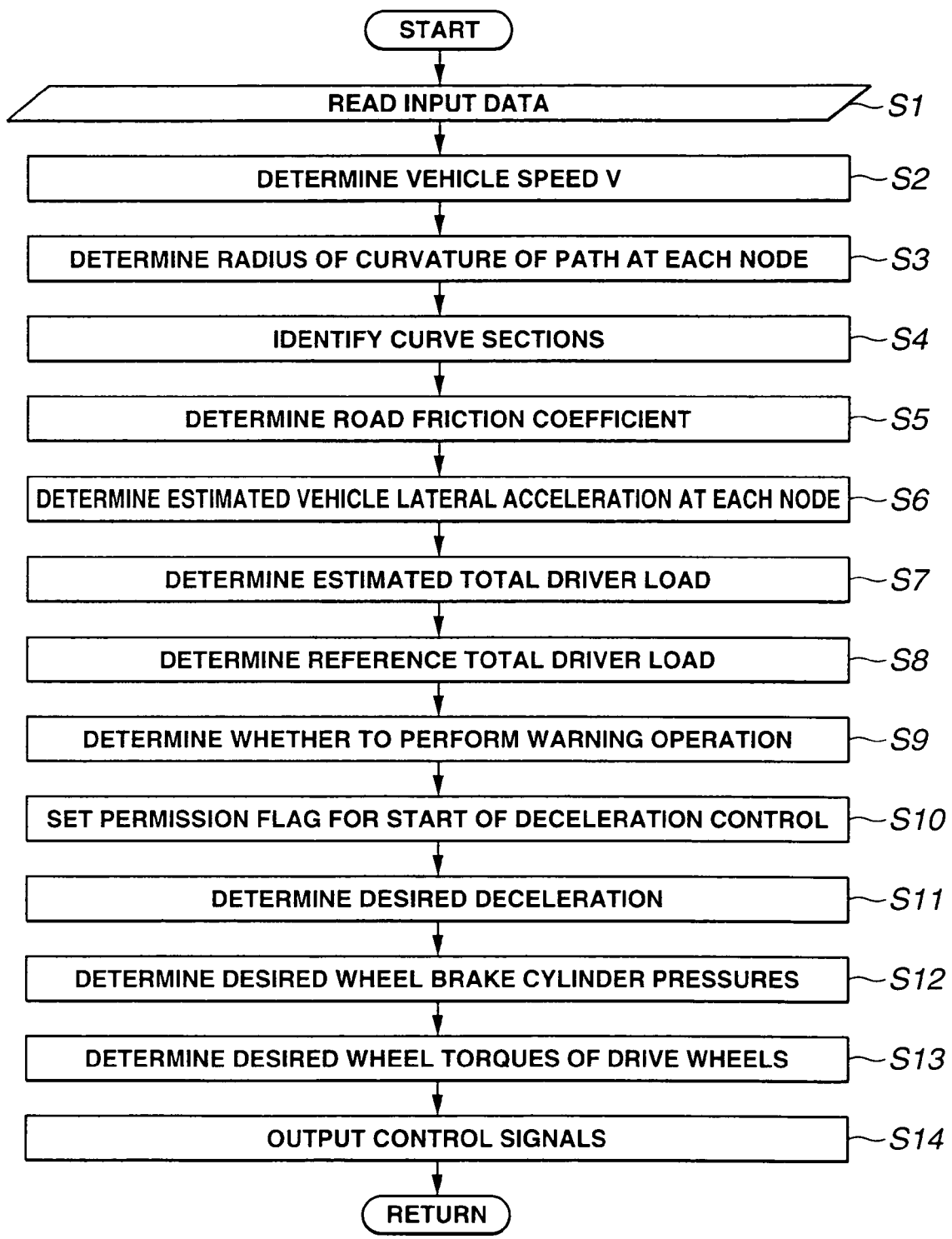

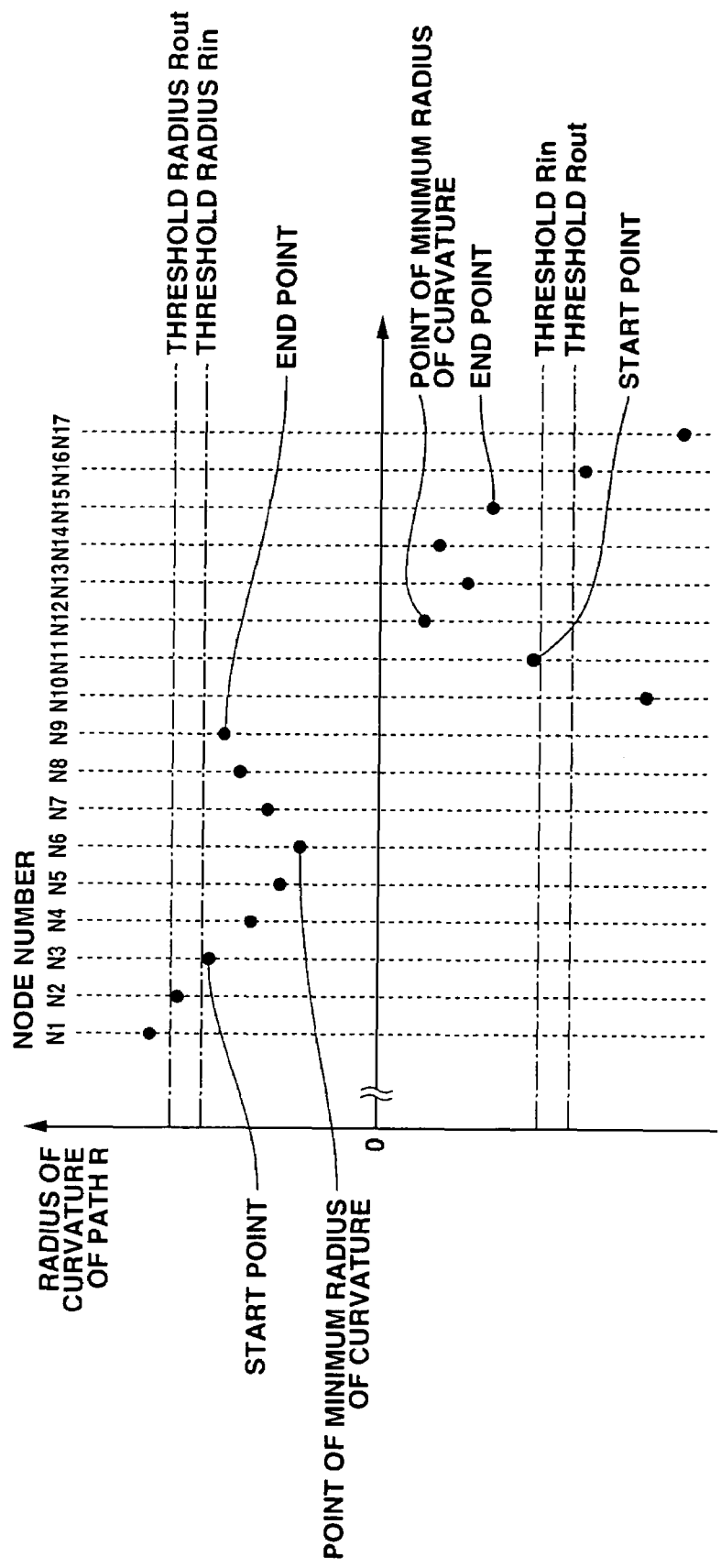

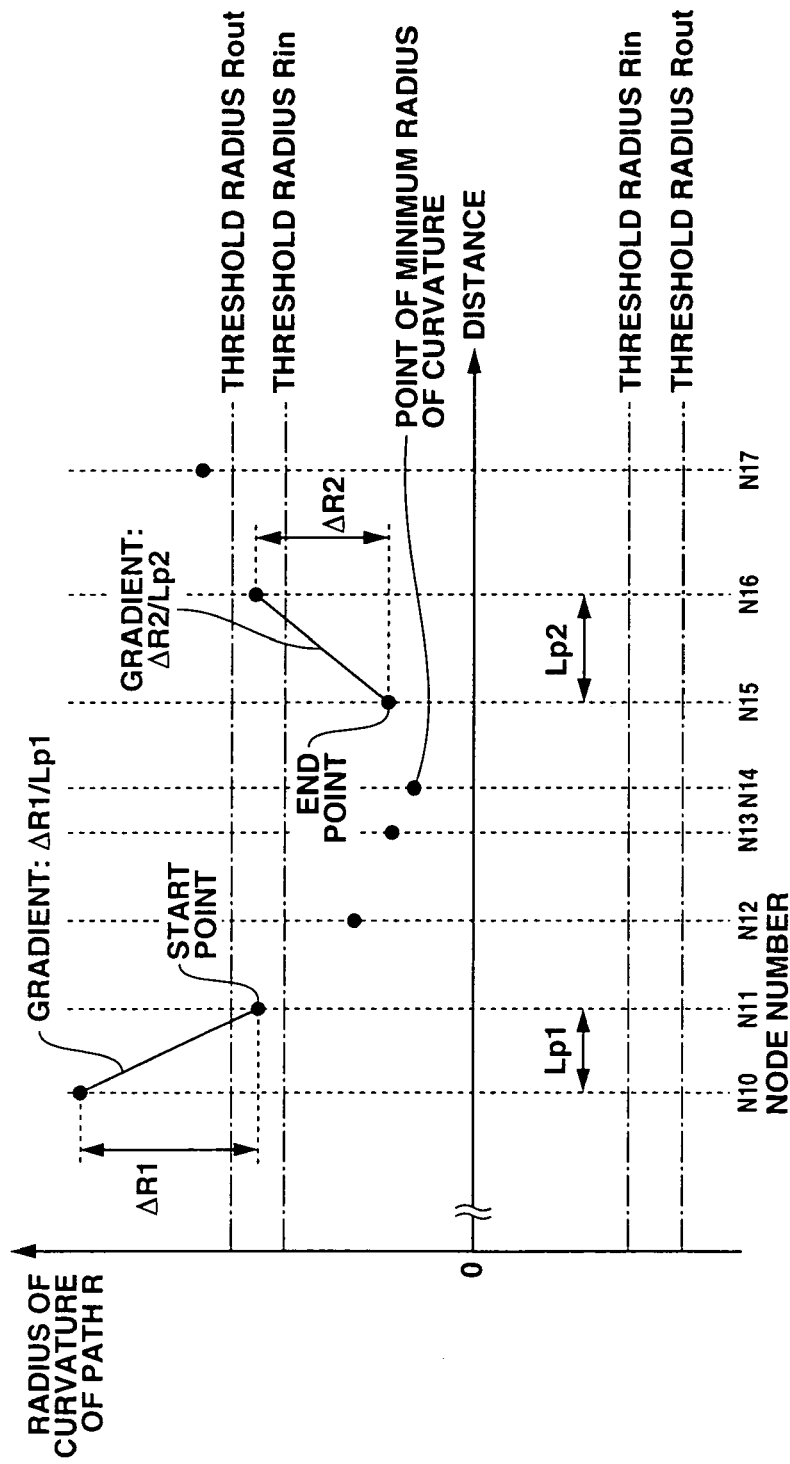

CURVE A

MINIMUM RADIUS OF CURVATURE
Ra

LENGTH OF CURVE SECTION
LDa

CURVE B

MINIMUM RADIUS OF CURVATURE
Rb = Ra

LENGTH OF CURVE SECTION
LDb > LDa

CURVE C

MINIMUM RADIUS OF CURVATURE
Rc > Rb = Ra

LENGTH OF CURVE SECTION
LDc > LDb > LDa

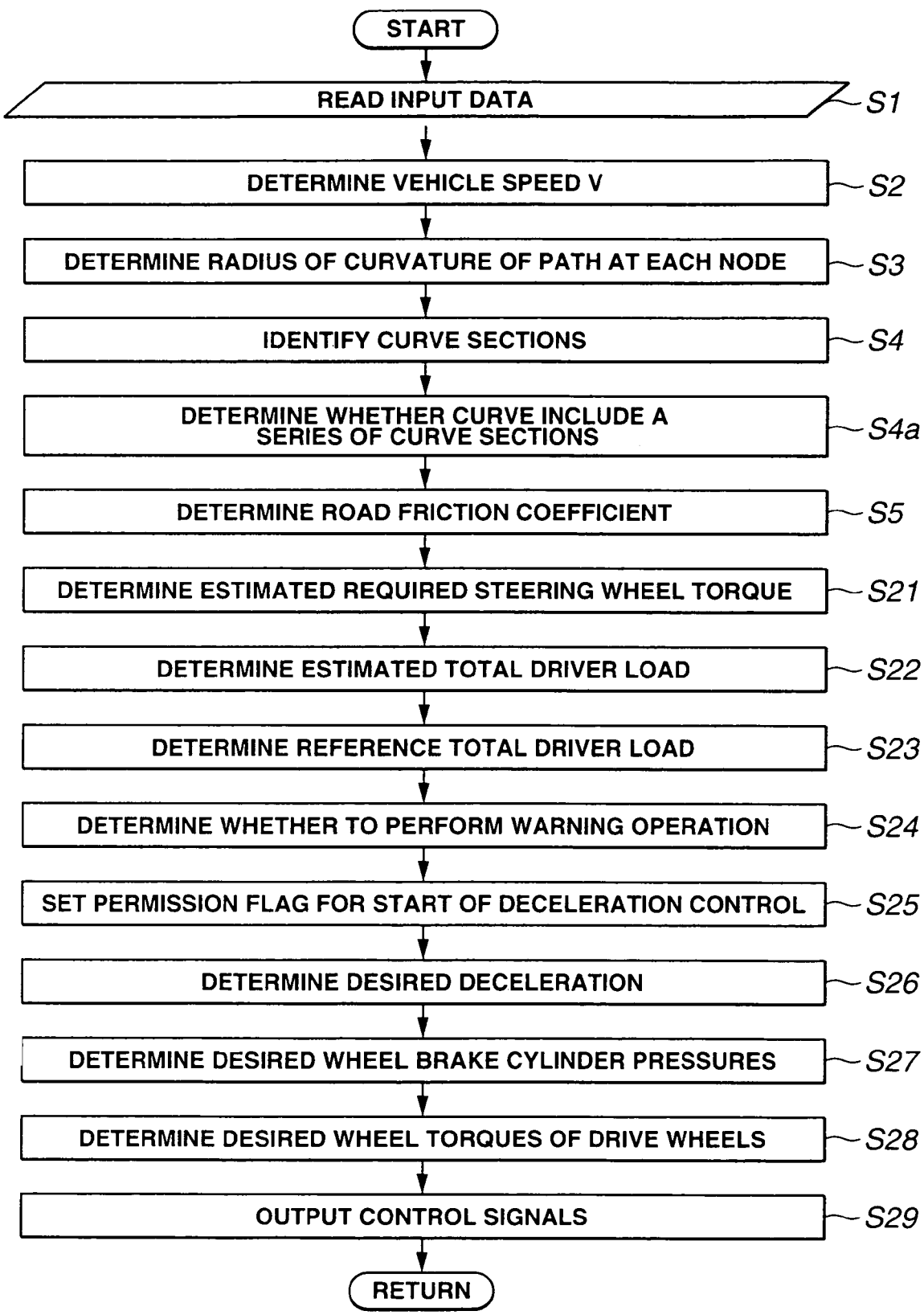

CURVE D

CURVE E

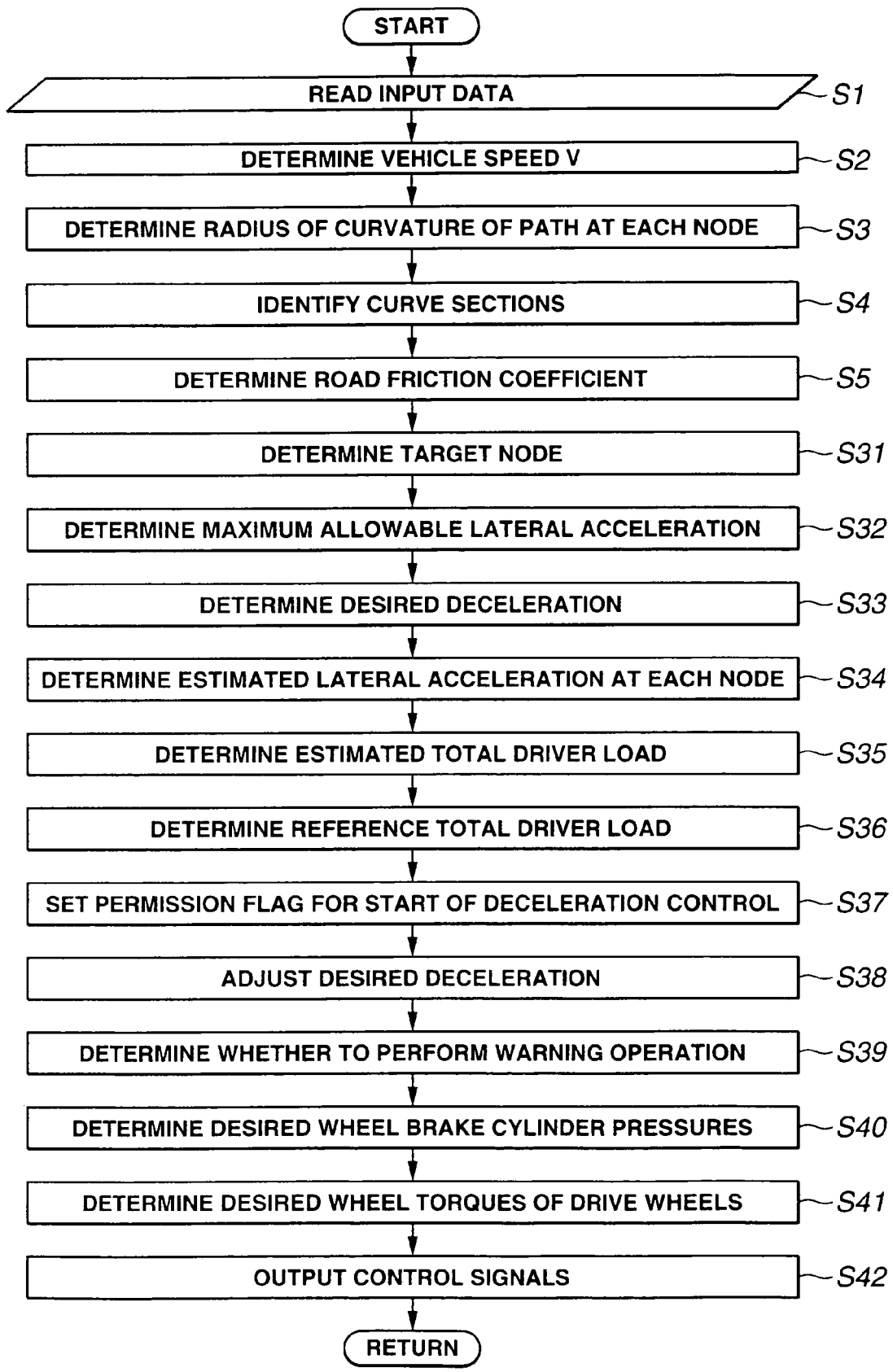

ADAPTIVE CRUISE CONTROL SYSTEM FOR AUTOMOTIVE VEHICLE

BACKGROUND OF THE INVENTION

The present invention relates generally to adaptive cruise control systems for automotive vehicles, and more particularly to an adaptive cruise control system for an automotive vehicle, which warns a driver and/or reduces a vehicle speed in advance of entry into an upcoming curve in accordance with a driving state of the vehicle.

In recent years, there have been proposed and disclosed various adaptive cruise control systems for automotive vehicles, which reduce the vehicle speed to reduce a tendency to understeer when the vehicle is traveling through a curve or a corner in a driving condition in which the vehicle lateral acceleration is larger than a threshold value. These systems prevent outside deviation or drift-off of the host vehicle from a current curved path even when the host vehicle enters a curve too fast due to driver's mistakes such as inadequate caution to the current path and wrong assessment of the current path. This enhances the stability of the vehicle to make the driver of the vehicle feel comfortable. A Published Japanese Patent Application No. H4(1992)-236699 (hereinafter referred to as "JP4-236699") shows an adaptive cruise control system for an automotive vehicle. This system obtains information about a forward curve based on information provided by a navigation system or infrastructural equipment, in advance of entering the curve. When the vehicle speed is too large to travel through the curve, the system starts to reduce the vehicle speed in advance of the entry into the curve. A Published Japanese Patent Application No. H8(1996)-194891 shows another adaptive cruise control system for an automotive vehicle. The system controls the host vehicle in consideration of errors in information from a navigation system.

SUMMARY OF THE INVENTION

With the adaptive cruise control system configured to control the vehicle dynamics in accordance with the actual lateral acceleration or the actual yaw rate of the host vehicle, the deceleration control operation is performed after a change in the vehicle dynamics. When the vehicle speed is too large, it is possible that the system produces inadequate amount of deceleration of the host vehicle so that the vehicle enters a curve too fast.

The adaptive cruise control system disclosed in JP4-236699, which is configured to obtain information about a forward curve based on information provided by a navigation system or infrastructural equipment, in advance of entering the curve, and to control the vehicle speed in advance of the entry into the curve in accordance with the curve information, reduces the vehicle speed before the host vehicle enters a curve, so that the host vehicle travels through the curve at a properly reduced speed. However, the system determines a desired speed that the host vehicle is traveling through a point of minimum radius of curvature of the curve, based on the minimum radius of curvature of the curve, and determines whether to perform a warning operation and a deceleration control operation, or calculates a desired deceleration, in accordance with the deviation of the host vehicle speed with respect to the desired speed and the distance between the point and the host vehicle. Therefore, depending on the shape of an upcoming or future or forward curve, it is possible that a driver feels that the start timing of the warning and dynamics control is late, or that the amount of deceleration or the produced vehicle speed reduction is inadequate. For example, when an upcoming curve is long or when the change of the path radius of an upcoming curve is large, a driver load is relatively large, so that it is possible that a driver feels that the start timing of the warning and dynamics control is late, or that the produced vehicle speed reduction is inadequate.

Accordingly, it is an object of the present invention to provide an adaptive cruise control system for an automotive vehicle, which warns a driver and/or reduces the vehicle speed to a proper cornering speed at a proper timing in accordance with the shape of an upcoming curve.

According to one aspect of the present invention, an adaptive cruise control system for an automotive vehicle, comprises: a trajectory determination section to collect trajectory information used to determine a future trajectory of the vehicle; a driving state determination section to collect vehicle information used to determine a driving state of the vehicle; an output section to change an operating condition of the vehicle; and a control unit in operative communication with the trajectory determination section, the driving state determination section, and the output section, the control unit being configured to perform the following: determining the vehicle future trajectory; determining the vehicle driving state; estimating in accordance with the vehicle future trajectory and the vehicle driving state a future driver load imposed on a driver of the vehicle during the vehicle traveling through a target section of the vehicle future trajectory; and changing the vehicle operating condition in accordance with the estimated future driver load, so that the future driver load decreases.

According to another aspect of the invention, an adaptive cruise control system for an automotive vehicle, comprises: trajectory determination means for collecting trajectory information used to determine a future trajectory of the vehicle; driving state determination means for collecting vehicle information used to determine a driving state of the vehicle; output means for changing an operating condition of the vehicle; and control means in operative communication with the trajectory determination means, the driving state determination means, and the output means, for performing the following: determining the vehicle future trajectory; determining the vehicle driving state; estimating in accordance with the vehicle future trajectory and the vehicle driving state a future driver load imposed on a driver of the vehicle during the vehicle traveling through a target section of the vehicle future trajectory; and changing the vehicle operating condition in accordance with the estimated future driver load, so that the future driver load decreases.

According to a further aspect of the invention, a method of controlling an automotive vehicle, comprises: determining a future trajectory of the vehicle; determining a driving state of the vehicle; estimating in accordance with the vehicle future trajectory and the vehicle driving state a future driver load imposed on a driver of the vehicle during the vehicle traveling through a target section of the vehicle future trajectory; and changing an operating condition of the vehicle in accordance with the estimated future driver load, so that the future driver load decreases.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 2 is a flow chart depicting a control operation of the adaptive cruise control system of FIG. 1 in accordance with a first embodiment of the present invention.

FIG. 3 is a diagram depicting a method of determining a curve section at step S4 in FIG. 2.

FIG. 4 is a diagram depicting another method of determining a curve section at step S4 in FIG. 2.

FIG. 7 is a flow chart depicting a control operation of the adaptive cruise control system of FIG. 1 in accordance with a second embodiment of the present invention.

FIG. 9 is a flow chart depicting a control operation of the adaptive cruise control system of FIG. 1 in accordance with a third embodiment of the present invention.

DETAILED DESCRIPTION OF THE INVENTION

Figure 1:
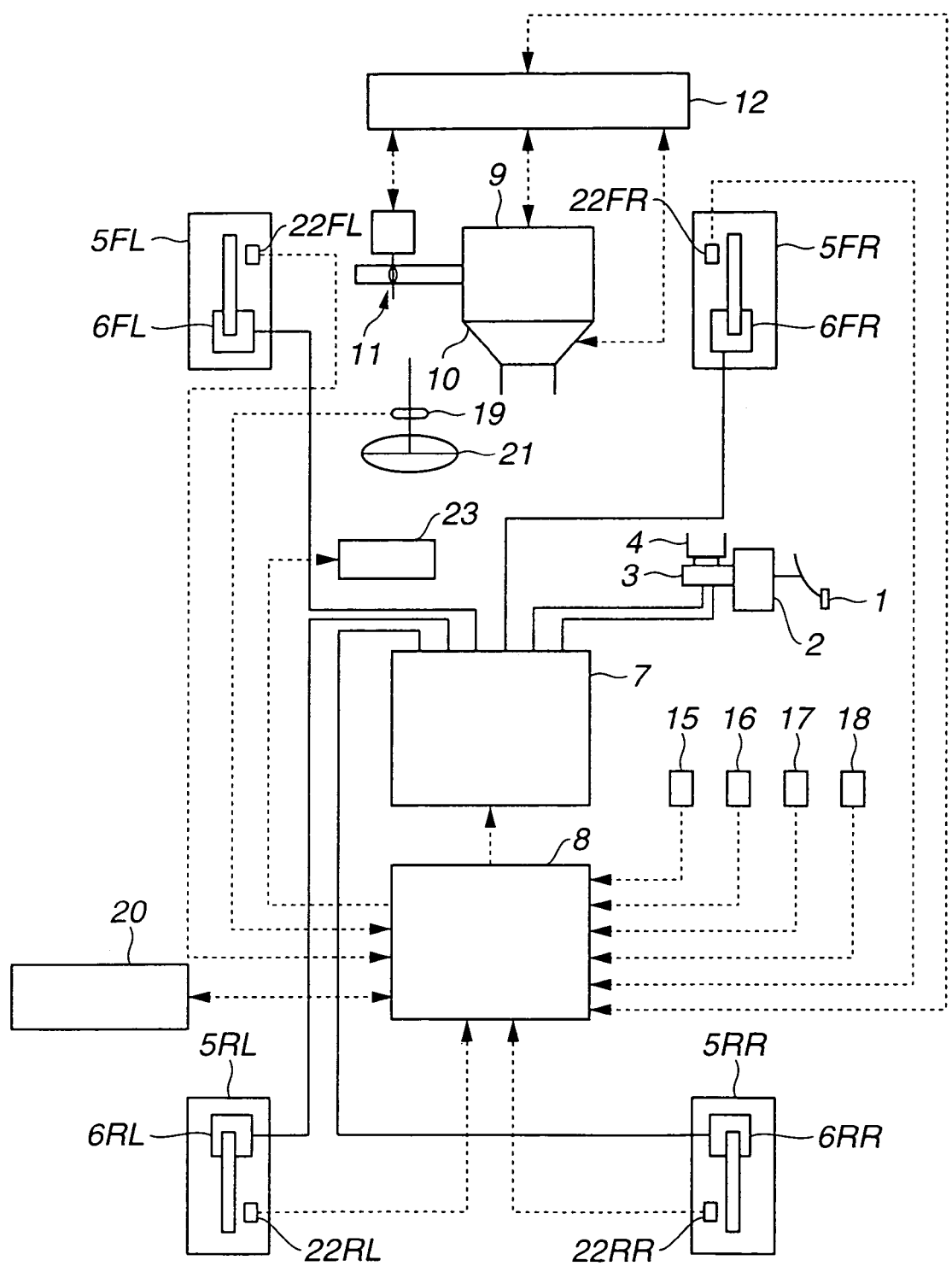
FIG. 1 is a schematic diagram depicting an automotive vehicle including an adaptive cruise control system in accordance with an embodiment of the present invention.

Referring now to drawings, particularly to FIGS. 1 through 6C, there is shown an adaptive cruise control system (adaptive curve entry control system) for an automotive vehicle in accordance with a first embodiment of the present invention. FIG. 1 is a schematic diagram depicting a rear drive automotive vehicle including the adaptive cruise control system. The automotive vehicle includes an automatic transmission, a conventional differential gear, and a brake system for independently controlling the breaking force of each of four road wheels. Under normal driving conditions in which the adaptive cruise control system performs no special control operation, depression of a brake pedal 1 causes an increase in the hydraulic brake pressure in a master cylinder 3 which is connected to a brake fluid reservoir 4. The hydraulic brake pressure in master cylinder 3 is adjusted in accordance with the position of brake pedal 1. Brake pedal 1 is connected to master cylinder 3 through a brake booster 2 for boosting the depressing force applied to brake pedal 1. The hydraulic brake pressure is supplied to wheel brake cylinders 6FL through 6RR each provided at road wheels 5FL through 5RR. In addition, the automotive vehicle includes a hydraulic modulator 7, a driving torque control unit 12, a warning system 23, a navigation system 20, and several sensors, as follows.

Hydraulic modulator 7, which is applicable to hydraulic control systems such as an anti-skid braking system and a traction control system, is disposed between master cylinder 3 and wheel brake cylinders 6FL through 6RR. Hydraulic modulator 7 includes actuators such as a linear solenoid valve, for controlling individually hydraulic brake pressures in wheel brake cylinders 6FL through 6RR. Hydraulic modulator 7 regulates or variably adjusts the hydraulic brake pressures in wheel brake cylinders 6FL through 6RR, in accordance with commands indicative of desired wheel brake cylinder pressures PsFL through PSRR output by an electrical control unit 8 (fully described below).

Driving torque control unit 12 is provided to control driving torques applied to left and right rear road wheels 5RL and 5RR as driving wheels by adjusting the operating condition of an engine 9, and the gear ratio of an automatic transmission 10. The engine operating condition is controlled by adjusting the quantity of fuel injection, the ignition timing, and the opening of a throttle valve 11. Driving torque control unit 12 is capable of controlling the driving torques for left and right rear road wheels 5RL and 5RR, independently of control unit 8. However, when control unit 8 sends a control signal indicative of desired driving torques to driving torque control unit 12, driving torque control unit 12 controls the driving torques in accordance with the desired driving torques.

In this automotive vehicle, several sensors are provided as a sensing section for measuring several elements of the operational state of the host vehicle. An acceleration sensor 15 is provided to measure a longitudinal acceleration Xg and a lateral acceleration Yg of the host vehicle. Actually, acceleration sensor 15 measures longitudinal acceleration Xg and lateral acceleration Yg of the center of gravity of the host vehicle. A yaw rate sensor 16 is provided to measure the yaw rate $\phi$ of the host vehicle. A master cylinder pressure sensor 17 is provided to measure an output pressure of master cylinder 3, called a master cylinder pressure Pm. An accelerator position sensor 18 is provided to measure the position of an accelerator pedal, called an accelerator opening Acc. A steering wheel angle sensor 19 is provided to measure a steering wheel angle $\theta$ of a steering wheel 21. Wheel speed sensors 22FL through 22RR are provided to measure the rotational speeds of road wheels 5FL through 5RR, called wheel speeds Vwi (i=FL through RR, namely, VwFL through VwRR). The signals corresponding to the elements of the operational state of the host vehicle detected by the sensors are input into control unit 8. On the other hand, driving torque control unit 12 sends a signal indicative of a driving torque Tw applied to a rear axle to control unit 8. If a variable concerning the operational state of the host vehicle has a lateral-directional value, a positive value of the variable indicates the left direction or deviation, and a negative value of the variable indicates the right direction. That is, yaw rate $\phi$, lateral acceleration Yg, and steering wheel angle $\theta$ have positive values during left turn, and negative values during right turn. The above-mentioned devices serve as a driving state determination section to collect vehicle information used to determine a driving state of the vehicle.

Warning system 23 is provided to warn a driver when the host vehicle is about to enter a curve too fast for the shape of the curve. Warning system 23 provides a warning to the driver. Warning system 23 includes a speaker to output a voice or a buzzer as audible information, and/or a monitor to display a warning message as visible information. The warning operation, which includes a warning of an overspeed hazard or an advance notice of a vehicle deceleration control operation (or a vehicle speed adjustment control operation, or a vehicle speed reduction control operation), is performed in accordance with a control signal from control unit 8, as described below.

Navigation system 20 is provided to present information about roads around the host vehicle. Navigation system 20 includes a memory unit to store road map information or data and road shape information or data, and a location determination section to determine the current location of the host vehicle based on information from a GPS antenna. Navigation system 20 relates the current location of the host vehicle to the road map data and the road shape data, to determine or retrieve information about a plurality of nodes in a section extending in a predetermined preview distance forward from the host vehicle. The node information includes location information including the X and Y coordinates (Xn, Yn) with respect to the host vehicle, and distance information including a distance Ln with respect to the host vehicle. The numerical subscript "n" represents the node number. Navigation system 20 sends the node information to control unit 8. Thus, navigation system 20 serves as a trajectory determination section to collect trajectory information used to determine a future trajectory of the vehicle.

In the shown embodiment, control unit 8 obtains information about a forward path (future path, or future trajectory) based on the node information from navigation system 20, as described above. Alternatively or in addition, however, the adaptive cruise control system may include a receiver to communicate with infrastructural equipment disposed back from a curve to obtain information about a forward curved path, namely a receiver to receive the trajectory information which is externally input from infrastructural equipment. The employment of the information from the infrastructural equipment provides accurate information about a curve which is actually measured and stored in the infrastructural equipment. The information from navigation system 20 depends on the road map data stored in navigation system 20, so that it may be possible that the accuracy of the information falls short of the infrastructural information. However, the employment of navigation system 20 provides the road information even when the road is equipped with no infrastructural equipment for the road information, or avoids a potential high cost of preparing the infrastructural equipment. The adaptive cruise control system may include any other device configured to obtain information about a forward curved path.

In stead of employing navigation system 20, the adaptive cruise control system may employ a CCD camera and an image-processing device, to obtain the road information. However, this image-based system deals only with a visible area which is narrower than navigation system 20. In addition, when the host vehicle is traveling on a road where the white lane marking lines is fading or covered by the snow, it may be impossible to detect the white lane marking lines. On the other hand, with navigation system 20, the adaptive cruise control system is capable of recognizing a wide area of roads, and performing the adaptive speed control in a more early and proper timing.

Control unit 8 includes an input/output interface (I/O), memories (RAM, ROM), and a microprocessor or a central processing unit (CPU). The input/output interface (I/O) of control unit 8 receives input information from the above-mentioned engine/vehicle sensors and the other devices, namely acceleration sensor 15, yaw rate sensor 16, master cylinder pressure sensor 17, accelerator opening sensor 18, steering wheel angle sensor 19, wheel speed sensors 22FL to 22RR, driving torque control unit 12, and navigation system 20. Within control unit 8, the central processing unit (CPU) allows the access by the I/O interface of input informational data signals from the engine/vehicle sensors. The CPU of control unit 8 is responsible for carrying out the engine/vehicle control program stored in the memories and is capable of performing necessary arithmetic and logic operations. Computational results, that is, calculated output signals are relayed through the output interface circuitry of control unit 8 to output stages, namely hydraulic modulator 7, driving torque control unit 12, and warning system 23. The output stages serve as an output section to change an operating condition of the vehicle, or a dynamic condition of the vehicle such as master cylinder pressure Pm and desired driving torque Trq.

Referring now to FIGS. 2 through 6C, the following describes operations and behaviors of the adaptive cruise control system in accordance with the first embodiment of the present invention. FIG. 2 is a flow chart depicting a routine or a sequence of a control operation of the adaptive cruise control system. The routine of FIG. 2 is repeatedly executed by control unit 8 at intervals of a predetermined processing time interval $\Delta T$ such as 10 ms, called by timer interrupt. Although steps of communications within control unit 8 is not shown in FIG. 2, processed data is stored in the memories, updating the previous data, and reference information is read from the memories, as occasion arises.

In accordance with the flow chart of FIG. 2, first, at step S1, control unit 8 reads input data from the sensors, and the control units. More specifically, control unit 8 reads longitudinal acceleration Xg, lateral acceleration Yg, yaw rate $\phi$, wheel speeds VwFL to VwRR, accelerator opening Acc, master cylinder pressure Pm, and steering wheel angle $\theta$, from the sensors, and driving torque Tw from driving torque control unit 12. In addition, control unit 8 reads from navigation system 20 the node information about an upcoming path.

Subsequent to step S1, at step S2, control unit 8 determines an estimated speed V of the host vehicle by calculating the average of the wheel speeds of the driven wheels, namely, the average of left front wheel speed VwFL and right front wheel speed VwFR. Alternatively, if the vehicle includes an ABS control unit which is configured to determine vehicle speed V during its operation, control unit 8 may read vehicle speed V from the ABS unit. Thus, control unit 8 determines the vehicle driving state.

Subsequent to step S2, at step S3, control unit 8 determines the radius of curvature of the future path at each node, based on the node information from navigation system 20. Actually, control unit 8 calculates the path radius at a target node, using the node information of three nodes including the target node, a node prior to the target node, and a node subsequent to the target node, and determining a curve connecting the three nodes. During the vehicle turning left, the path radius is a negative value, while during the vehicle turning right, the path radius is a positive value. Although the system of the shown embodiment employs the above-mentioned method, it is optional to employ a method to calculate the path radius by using the angles between the lines connecting two adjacent nodes. The adaptive cruise control system may employ any other method capable of calculating the path radius of each node. Alternatively or in addition, however, the adaptive cruise control system may employ a method to determine the path radius by reading data stored in navigation system 20 which may be provided by infrastructural equipment disposed before a curve. In this case, the node information includes the information on the path radius.

Subsequent to step S3, at step S4, control unit 8 identifies or locates or determines curve sections as target sections of the control. In other words, control unit 8 determines the vehicle future trajectory. More specifically, control unit 8 determines whether or not there is a curve section, and determines a start point and an end point of the curve section if there is a curve section. The determination is performed based on the path radiuses before the host vehicle enters the associated curve section, in other words, while the host vehicle is out of curve sections. The first node at which the absolute value of the path radius is smaller than or equal to a predetermined threshold radius Rin is defined as the start point of the curve section. In such a case as shown in FIG. 3, node N3 is the start point of the curve section.

In FIG. 3, nodes are arranged in order of the node number in the horizontal axis. The node number is incremented and given to nodes in order of increasing distance with respect to the host vehicle. The vertical axis represents the radius R of curvature of the path. FIG. 3 shows a specific case in which the forward path includes two curve sections. The coming path of FIG. 3 includes no bifurcation. The first node at which the path radius is a locally minimum value after the start point of the curve section is defined as a point of minimum radius of curvature. In the case of FIG. 3, node N6 is the point of minimum radius of curvature. The first node at which the absolute value of the path radius is larger than or equal to a predetermined threshold radius Rout is defined as the end point of the curve section. In the case of FIG. 3, node N9 is the end point of the curve section.

Nodes subsequent to the end pinot of the first curve section are identified or defined in the same fashion as mentioned above. Thus, if there are a plurality of curve sections in a preview section, control unit 8 determines or defines the plurality of curve sections, namely the plurality of sets of the start point and the end point of curve sections. In the case of FIG. 3, node N11 is defined as a second start point of a second curve section, as node N11 is the first node at which the absolute value of the path radius becomes smaller than or equal to threshold radius Rin after the end point of the first curve section. Node N12 is defined as a second point of minimum radius of curvature of the second curve section, because node N12 is the point at which the absolute value of the path radius is a first locally minimum value after the last end point. Node N15 is defined as a second end point of the second curve section, because node N16 subsequent to node N15 is the first node at which the absolute value of the path radius becomes larger than or equal to threshold radius Rout. Threshold radius Rout is predetermined to be larger than threshold radius Rin. Control unit 8 identifies curve sections in a preview section, namely, defines the nodes in the preview section extending a predetermined preview distance from the host vehicle. The preview distance is determined based on the vehicle speed and a workload of control unit 8 that is required to handle the preview section.

As mentioned above, the identification of the start point and end point of curve sections is implemented by comparing the path radius with the threshold values in the shown embodiment. However, alternatively, the identification may be implemented by determining a start point based on a rate of change in path radius Rrat which is calculated using the following equation (1).

$$Rrat = \Delta R / Lp \quad (1)$$

where Lp represents a distance between adjacent two nodes ($=Ln-L(n-1)$), and $\Delta R$ represents a difference in the absolute value of the path radius between adjacent two nodes ($=|Rn|-|R(n-1)|$). If there is a node at which rate of change in path radius Rrat varies to be smaller than a predetermined threshold value −Rrats, the node is defined as a start point of a curve section. On the other hand, when rate of change in path radius Rrat varies to be larger than threshold value Rrats at a node after the point of minimum path radius, a node prior to the node is defined as an end point of the curve section.

FIG. 4 shows a case in which the system employs the above-described alternative method of determination of the start and end points of curve sections. The path radius of each node varies as shown in FIG. 4. At node N11, rate of change in path radius Rrat ($=\Delta R1/Lp1$) changes to be smaller than threshold value −Rrats, so that node N11 is defined as a start point of a curve section. On the other hand, with the method based on the comparison between the path radius and threshold radius Rin, node N11 is not defined as a start point because path radius R11 at node N11 is not smaller than threshold radius Rin. Node N14 is is defined as a point of minimum path radius of the curve section, because node N14 is the first node at which the path radius is a locally minimum value after the start point of the curve section. Node N15 is defined as an end point of the curve section, because the absolute value of the path radius (R16) changes to be larger than threshold value Rrats at node N16 subsequent to node N15. On the other hand, with the method based on the comparison between the path radius and threshold radius Rout, node N15 is not defined as a start point because path radius R16 at node N16 is not larger than threshold radius Rout. Thus, the two different method of node identification may yield different results. The system may employ a method suitable to its design target.

In the shown embodiment, the point of minimum path radius is the first node at which the path radius varies to be a first locally minimum value after the start point of the curve section, as mentioned above. However, alternatively, a node at which the path radius is a globally minimum value in the whole curve section may be defined as a point of minimum path radius. In the shown embodiment, when the host vehicle is traveling in a curve section, the adaptive cruise control system inhibits the operation of determination of curve sections, as mentioned above. However, it is optional to determine a next curve section following the end point of the current curve section, when the host vehicle is traveling in a curve section.

Subsequent to step S4, at step S5, control unit 8 estimates the coefficient of friction of the road, or road friction coefficient Kμ. Road friction coefficient Kμ is determined using a relationship between the driving/braking forces applied to the wheels and the slip rates of the road wheels. The driving state of the host vehicle other than the driving/braking forces and the slip rates may be employed to estimate road friction coefficient Kμ. However, the adaptive cruise control system may employ any other method capable of determining road friction coefficient Kμ. If there is infrastructural equipment on roads which provides friction information about road friction coefficient Kμ, control unit 8 may be supplied with the friction information in advance of entry into a curve. The system may employ a selection switch which is manually operated based on driver's estimation by means of the eyes. The selection switch may provide discontinuous settings such as a high setting (dry setting, e.g. 0.8), a middle setting (wet setting, e.g. 0.6), and a low setting (packed-snow setting, e.g. 0.4). This set of discrete settings allows a driver to easily select or determine road friction coefficient Kμ.

Subsequent to step S5, at step S6, control unit 8 determines an estimated lateral acceleration Ygen of the host vehicle at each node, assuming that the host vehicle travels through the curve section at the current vehicle speed. Lateral acceleration Ygen is a dynamic quantity indicative of the driver load in the curve section. Estimated lateral acceleration Ygen is calculated using the following equation (2) based on the current vehicle speed V and the path radius Rn at a node Nn.

$$Ygen = V^2/|Rn| \quad (2)$$

Subsequent to step S6, at step S7, control unit 8 determines an estimated total driver load TWL that is imposed on a driver during the host vehicle traveling through the curve section. In other words, control unit 8 estimates an integrated driver load TWL which is imposed during the host vehicle traveling from the start point of the curve section to the end point of the curve section. Estimated total driver load TWL is calculated using the following equation (3) based on estimated lateral acceleration Ygen which is determined at step S5, distance Ldn (the distance from node N−1 to node N), and vehicle speed V.

$$TWL = \Sigma[Ygen \cdot \{Ld(n+1)/V\}] \quad (3)$$

where $\Sigma$ represents a sum from the start point of the curve section to the node prior to the end point of the curve section. This calculation is based on approximation that the lateral acceleration at node N is constantly applied from node N to node N+1. However, alternatively, the lateral acceleration between nodes may be interpolated and used to calculate estimated total driver load TWL.

Subsequent to step S7, at step S8, control unit 8 determines a reference total driver load TWLs. More specifically, control unit 8 estimates a future driver load imposed on a driver of the vehicle during the vehicle traveling through a target section of the vehicle future trajectory, in accordance with the vehicle future trajectory and the vehicle driving state. Reference total driver load TWLs indicates a total load which is applied to the driver during the host vehicle traveling at an allowable cornering speed (a typical or maximum allowable cornering speed) with which the host vehicle can stably travel through the curve. More specifically, reference total driver load TWLs is calculated using the following equation (4).

$$TWLs = K\mu \cdot Ygs \cdot (LD/V) \quad (4)$$

where LD represents the length of the curve section, or the length of the trajectory from the start point of the curve section to the end point of the curve section, and Ygs represents a typical lateral acceleration such as 0.25 G (G represents an acceleration of gravity) which is imposed on the host vehicle or the driver during the host vehicle traveling stably through curves. (LD/V) indicates a time period during which the host vehicle is traveling through the curve section. Multiplying by (LD/V) allows comparison between estimated total driver load TWL and reference total driver load TWLs.

In the shown embodiment, estimated total driver load TWL and reference total driver load TWLs are calculated by integrating (time-integrating) the instantaneous driver load along the trajectory from the start point of the curve section to the end point of the curve section. However, alternatively, they may be calculated by integrating the instantaneous driver load along the trajectory from the start point of the curve section to the point of minimum path radius, because a section from the start point of the curve section to the point of minimum path radius is more significant.

Subsequent to step S8, at step S9, control unit 8 determines whether or not to perform a predetermined warning operation. The determination is based on a deviation between estimated total driver load TWL and reference total driver load TWLs. More specifically, when a driver load deviation $\Delta TWL$ which is produced by subtracting reference total driver load TWLs from estimated total driver load TWL is larger than a predetermined warning threshold driver load TWLwr, control unit 8 determines to perform the warning operation. Warning threshold driver load TWLwr is predetermined based on the dynamic characteristic of the host vehicle. Warning threshold driver load TWLwr may be a fixed value or a variable setting which is configured to be manually adjusted within predetermined limits by a driver.

Figure 5A:
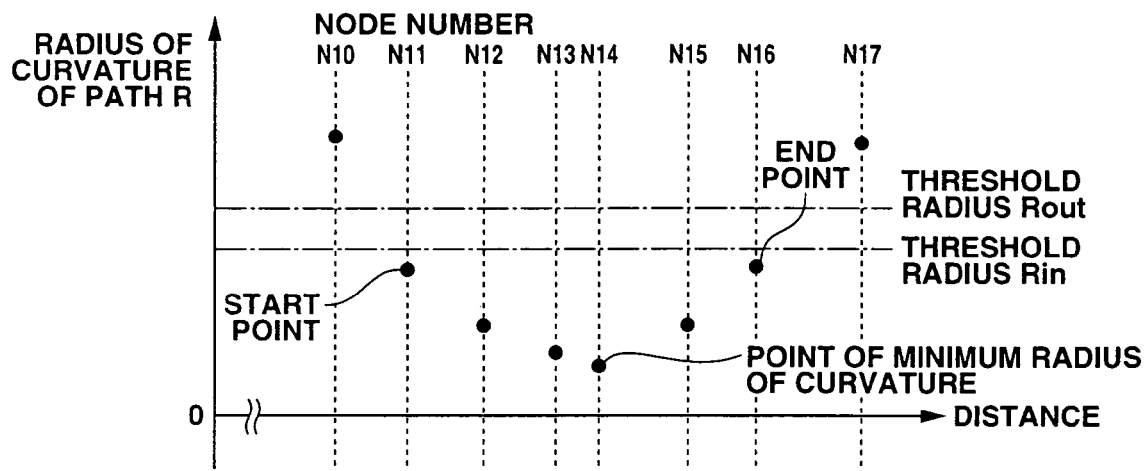
FIGS. 5A and 5B are diagrams depicting a relationship between an estimated total driver load TWL and a reference total driver load TWLs.
Figure 5B:
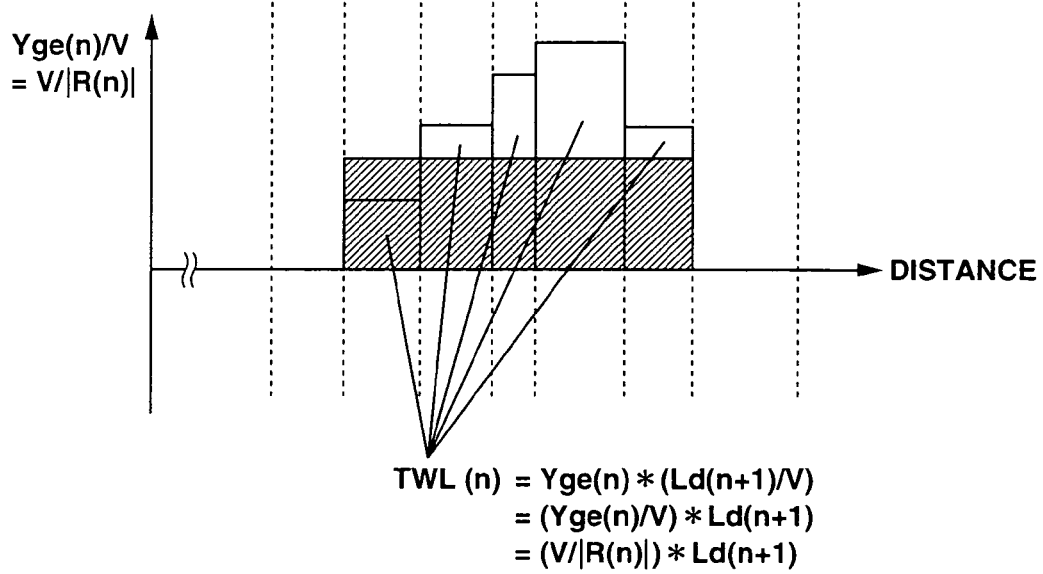

FIGS. 5A and 5B show the relationship between estimated total driver load TWL and reference total driver load TWLs. Estimated total driver load TWL is the sum of areas of the open rectangles in FIG. 5B. Reference total driver load TWLs is the area of the diagonally shaded rectangle in FIG. 5B. When the host vehicle enters and travels through a curve section at an allowable cornering speed that the vehicle can travel stably with high cornering stability through the curve section, instantaneous driver load TWL(n) at each node is smaller than or equal to a normal reference driver load. Accordingly, estimated total driver load TWL is smaller than or equal to reference total driver load TWLs. Instantaneous driver load TWL(n) increases with increasing vehicle speed and with decreasing path radius. When the host vehicle enters and travels through the curve section at an excessive speed, TWL(n) is relatively small during the path radius being large, and is relatively large during the path radius being small, in such a case as shown in FIGS. 5A and 5B. As a whole, estimated total driver load TWL is larger than or equal to reference total driver load TWLS.

Subsequent to step S9, at step S10, control unit 8 sets a deceleration flag Fok indicative of allowance or inhibition of initiating a new warning and deceleration control operation. With deceleration flag Fok, the adaptive cruise control system is configured to perform the warning and deceleration control operation only once for one curve section. Accordingly, deceleration flag Fok is set to prevent repeated executions of the warning and deceleration control operation. When control unit 8 determines to perform the warning operation at step S9, deceleration flag Fok is set to "OFF". "OFF" status indicates that initiation or execution of a new process of the warning and deceleration control operation is inhibited. After the host vehicle passes through the end point of a curve section, deceleration flag Fok is set to "ON". Thus, a new deceleration control operation is inhibited from the time point at which control unit 8 determines to perform the warning operation, to the time point at which the host vehicle passes through the end point of the curve section.

Subsequent to step S10, at step S11, control unit 8 determines a desired deceleration Xgs. Desired deceleration Xgs is determined in different manners which are switched in accordance with deceleration flag Fok. When deceleration flag Fok is "OFF", indicating inhibition of the warning and deceleration control, that is, when the host vehicle is traveling under a condition in which the deceleration control operation is to be performed, desired deceleration Xgs is calculated using the following equation (5) based on driver load deviation $\Delta TWL$ between estimated total driver load TWL and reference total driver load TWLs which is calculated at step S7.

$$Xgs = \min\{Kg \cdot (\Delta TWL - TWLcnt), Xgs0\} \quad (5)$$

where min{ } represents a function of selecting a minimum from a list of arguments inside the parentheses { }, Kg represents a predetermined control gain, and TWLcnt represents a predetermined threshold value used to determine whether or not to actually perform the deceleration control operation. Deceleration threshold total driver load TWLcnt is predetermined to be larger than warning threshold driver load TWLwr. Accordingly, the warning operation starts in advance of the deceleration control operation. As in the case of warning threshold driver load TWLwr, deceleration threshold total driver load TWLcnt may be predetermined based on the dynamic characteristic of the host vehicle. Alternatively, deceleration threshold total driver load TWLcnt may be a variable setting which is configured to be manually adjusted within predetermined limits by a driver. Xgs0 in the equation (5) represents or serves as an upper limit value of desired deceleration Xgs. Deceleration limit Xgs0 is a fixed value such as 0.3 G, which is predetermined based on the reliability or the accuracy of navigation system 20.

On the other hand, when deceleration flag Fok is "ON", control unit 8 determines desired deceleration Xgs to be zero. More specifically, desired deceleration Xgs is set and held to be zero, from the end point of the last curve section until the next determination to perform the warning operation. When desired deceleration Xgs is larger than zero (Xgs>0), control unit 8 sets a deceleration operating flag Fg to "ON" which indicates that the system is performing the deceleration control operation. Conversely, when desired deceleration Xgs is smaller than or equal to zero (Xgs≦0), control unit 8 sets deceleration operating flag Fg to "OFF" which indicates that the system is not performing the deceleration control operation.

Subsequent to step S11, at step S12, control unit 8 determines desired wheel brake cylinder pressures Psi (i=fl to rr, namely, Psfl through Psrr) applied to wheel brake cylinders 6FL to 6RR. First, wheel brake cylinder pressure Pc is calculated using the following equation (6) based on desired deceleration Xgs.

$$Pc=Kb1 \cdot Xgs \tag{6}$$

where Kbl represents a conversion factor for converting desired deceleration Xgs to wheel brake cylinder pressure Pc, which is a fixed value predetermined based on the specification of the host vehicle such as the specification of the brake system. Next, desired front wheel brake cylinder pressure PsF and desired rear wheel brake cylinder pressure PsR are calculated using the following equation (7) based on master cylinder pressure Pm and wheel brake cylinder pressure Pc.

$$PsF=\max(Pm, Pc)$$

$$PsR=h(PsF) \tag{7}$$

where max ( ) represents a function of selecting a maximum among a list of arguments inside the parentheses ( ), and h( ) represents a function of calculating desired rear wheel brake cylinder pressure PsR based on desired front wheel brake cylinder pressure PsF to optimize the proportion of desired rear wheel brake cylinder pressure PsR and desired front wheel brake cylinder pressure PsF. Finally, desired wheel brake cylinder pressures Psfl through Psrr are calculated using the following equation (8) based on desired front wheel brake cylinder pressure PsF and desired rear wheel brake cylinder pressure PsR.

$$Psfl=Psfr=PsF$$

$$Psrl=Psrr=PsR \tag{8}$$

Subsequent to step S12, at step S13, control unit 8 determines desired driving torque Trq. Desired driving torque Trq is determined in different manners which are switched in accordance with whether or not the deceleration control operation is being performed, namely with deceleration operating flag Fg. When the deceleration control operation is not performed, desired driving torque Trq is determined to be a driving torque corresponding to accelerator opening Acc (Trq=f(Acc)). On the other hand, when the deceleration control operation is being performed, control unit 8 reduces the engine output to cancel desired driving torque Trq corresponding to the position of the accelerator pedal are cancelled. More specifically, adjusted desired driving torque Trq is calculated using the following equation (9).

$$Trq=f(Acc)-g(Pc) \tag{9}$$

where g( ) represents a function of calculating a canceling torque equivalent to the desired braking torque based on wheel brake cylinder pressure Pc.

Subsequent to step S13, at step S14, control unit 8 issues a control signal to hydraulic modulator 7 to generate desired wheel brake cylinder pressure Psfl to Psrr which are calculated at step S12, and a control signal to driving torque control unit 12 to generate desired driving torque Trq which is calculated at step S13. When driver load deviation ΔTWL is larger than warning threshold driver load TWLwr, control unit 8 operates warning system 23 to inform the driver that the host vehicle is about to enter an upcoming curve at too high a speed, and to display or warn the driver of the start of the deceleration control operation in advance. When driver load deviation ΔTWL is brought to be smaller than warning threshold driver load TWLwr, or when deceleration flag Fok is brought to be "ON", control unit 8 terminates the warning operation of warning system 23. Subsequent to step S14, the routine returns. As the whole routine of FIG. 2 which is called by timer interrupt is completed as mentioned above, the routine returns to the main program of control unit 8. As mentioned above, control unit 8 changes the vehicle operating condition in accordance with the estimated future driver load, so that the future driver load decreases. More specifically, control unit 8 issues the warning in accordance with the estimated future driver load, and controls the vehicle dynamic condition in accordance with the estimated future driver load, so that the future driver load decreases.

The following describes functions and behaviors of the adaptive cruise control system configured as described above in accordance with the first embodiment of the present invention. Receiving from navigation system 20 the node information about nodes within a preview section, control unit 8 calculates the path radius at each of the nodes within the preview section, and determines or identifies curve sections in accordance with the path radius of the preview section (step S4). Subsequently, control unit 8 determines estimated lateral acceleration Ygen based on the current vehicle speed V and the path radius (step S6). Subsequently, control unit 8 determines estimated total driver load TWL in accordance with estimated lateral acceleration Ygen (step S7). Subsequently, control unit 8 determines reference total driver load TWLs which is applied to a driver during the host vehicle traveling at an allowable cornering speed (step S8). Subsequently, control unit 8 calculates driver load deviation ΔTWL between estimated total driver load TWL and reference total driver load TWLs.

When the host vehicle is about to enter a curve section at an allowable cornering speed, estimated total driver load TWL and reference total driver load TWLs are comparable. Accordingly, driver load deviation ΔTWL is relatively small so that driver load deviation ΔTWL is smaller than warning threshold driver load TWLwr. Therefore, when the host vehicle is about to enter a curve section at an allowable cornering speed, the adaptive cruise control system performs no warning operation. In addition, the adaptive cruise control system performs no deceleration control operation, because deceleration flag Fok is held to be "ON" so that desired deceleration Xgs is zero.

On the other hand, when the host vehicle is about to enter a curve section at a speed faster than an estimated maximum allowable cornering speed, estimated lateral acceleration Ygen is large in accordance with a high vehicle speed at each node. Accordingly, estimated total driver load TWL is large so that driver load deviation ΔTWL is large. When driver load deviation ΔTWL gets larger than warning threshold driver load TWLwr, the adaptive cruise control system performs the warning operation, and sets deceleration flag Fok to "OFF". The system calculates desired deceleration Xgs based on the difference between driver load deviation ΔTWL and deceleration threshold total driver load TWLcnt. When driver load deviation ΔTWL is smaller than deceleration threshold total driver load TWLcnt, desired deceleration Xgs is a negative value. Accordingly, the adaptive cruise control system performs the warning operation but the deceleration control operation. When driver load deviation ΔTWL is larger than deceleration threshold total driver load TWLcnt, desired deceleration Xgs is a positive value. Accordingly, the system performs the deceleration control operation in which desired deceleration Xgs is produced in accordance with driver load deviation ΔTWL. When desired deceleration Xgs calculated based on driver load deviation ΔTWL is larger than deceleration limit Xgs0, the system performs the deceleration control operation in accordance with deceleration limit Xgs0. With the above-mentioned control, when the host vehicle is about to enter a curve section at a speed faster than the allowable cornering speed, the adaptive cruise control system performs the warning operation and the deceleration control operation, to decelerate the host vehicle, and thereby to prevent the host vehicle from entering the curve section at too fast a speed. With the deceleration control operation performed, the host vehicle can travel in the curve section stably so that the driver is confronted of no large load. As a result of the above-mentioned control operation, the deceleration control operation reduces vehicle speed V of the host vehicle, to reduce estimated total driver load TWL. When driver load deviation ΔTWL becomes smaller than deceleration threshold total driver load TWLcnt, the deceleration control operation is terminated. When driver load deviation ΔTWL becomes larger than or equal to deceleration threshold total driver load TWLcnt again, the deceleration control operation is initiated. When vehicle speed V decreases so that driver load deviation ΔTWL decreases to be smaller than warning threshold driver load TWLwr, the warning operation is terminated.

Figure 6A:
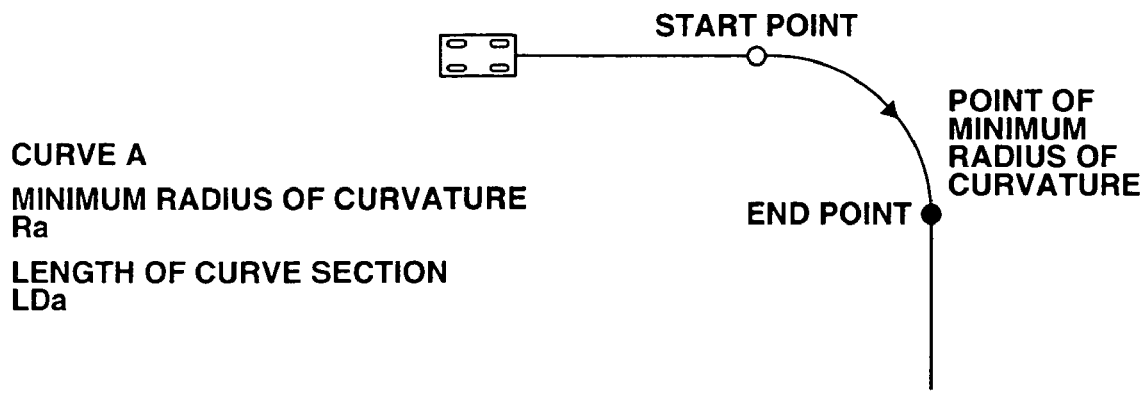
FIG. 6A is a diagram depicting a case in which the host vehicle is traveling through a curve A.
Figure 6B:
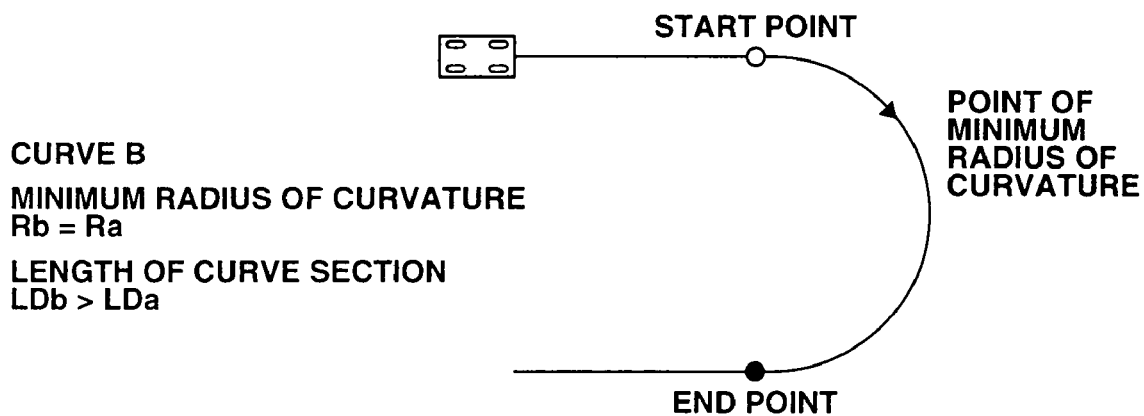
FIG. 6B is a diagram depicting a case in which the host vehicle is traveling through a curve B.
Figure 6C:
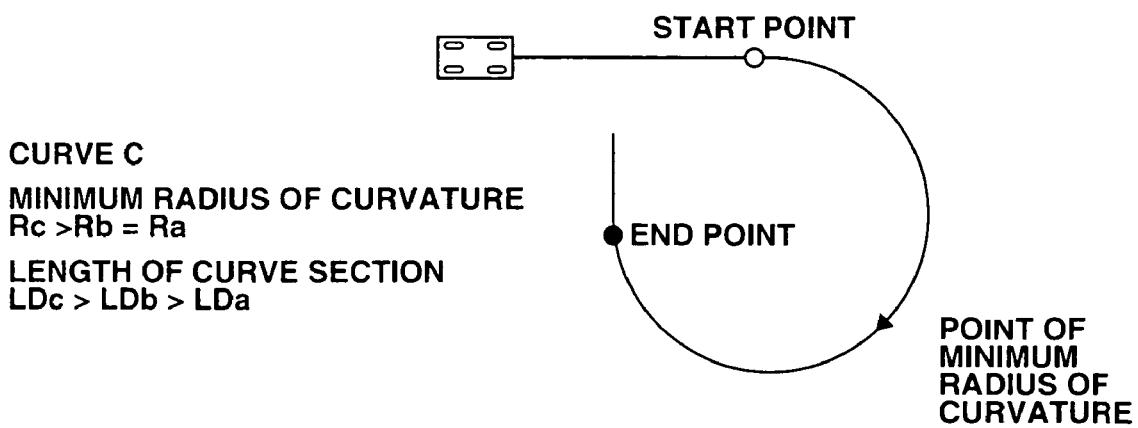
FIG. 6C is a diagram depicting a case in which the host vehicle is traveling through a curve C.

The following describes operations and behaviors of the adaptive cruise control system of the first embodiment in more specific cases shown in FIGS. 6A through 6C. FIG. 6A shows a curve A with a minimum path radius of Ra, and a curve section length of LDa. FIG. 6B shows a curve B with a minimum path radius of Rb, and a curve section length LDb. Minimum path radius Rb is comparable or equal to minimum path radius Ra. The point of minimum path radius of curve B is in the same location as that of curve A. Curve section length LDb is larger than curve section length LDa. FIG. 6C shows a curve C with a minimum path radius of Rc and a curve section length LDc. Minimum path radius Rc is larger than minimum path radius Ra and minimum path radius Rb. Curve section length LDc is larger than curve section length LDb.

The following describes a case in which an adaptive cruise control system determines a desired vehicle speed at which the host vehicle travels through the point of minimum path radius, and performs a warning operation and a deceleration control operation in accordance with a deviation between the desired vehicle speed and the current vehicle speed and with the distance from the current location of the host vehicle to the point of minimum path radius. In this case, the system performs the warning and deceleration control operation in a same manner in the cases of curve A and curve B. More specifically, the system performs the warning operation and initiates the deceleration control operation a same distance back from the start point of the curve sections of curve A and curve B, because the relative location of the point of minimum path radius of curve A is same as that of curve B. As shown in FIGS. 6A and 6B, the length of the curve section of curve B is larger than that of curve A. Even if the system is capable of reducing the vehicle speed to the allowable cornering speed corresponding to curve A in advance of entering the curve section of curve A by the deceleration control operation, it is possible that the same control operation is not enough in the case of curve B. In the case of curve B the amount of driver's steering operation that is required during the host vehicle traveling through the curve section is larger than in the case of curve A, because the length of the curve section of curve B is longer than that of curve A. In addition, in some cases in curve B, the driver is needed to perform braking operation while the host vehicle is traveling through the curve section. Therefore, it is possible that the driver feels that the produced vehicle speed reduction is inadequate or the start timing of the warning operation is late. On the other hand, in the case of curve C, the point of minimum path radius is located farer from the start point than in the cases of curve A curve B. Accordingly, in the case of curve C, the point at which the warning operation is performed and the deceleration control operation is started is nearer to the start point than in the cases of curve A and curve B. In addition, the desired vehicle speed reduction is determined with reference to the point of minimum path radius. Therefore, it is possible that the vehicle speed is not reduced enough until the host vehicle is traveling through the start point of the curve section. Therefore, in the case of curve C, the driver is needed to operate the brake pedal or thinks that the timing of start of the warning operation and the deceleration control operation is late and the speed reduction is not enough.

On the other hand, the adaptive cruise control system of the first embodiment operates and behaves as follows. When the host vehicle is about to enter a curve, the system determines estimated total driver load TWL indicative of an integrated load that is imposed on a driver during the host vehicle traveling through the curve section of the curve, and performs the warning and deceleration control operation in accordance with estimated total driver load TWL. Estimated total driver load TWL is determined in consideration of the length of the curve section, and the location of the point of minimum path radius. The start timing of the warning and deceleration control operation and the desired speed reduction of the deceleration control operation are determined in accordance with estimated total driver load TWL. Therefore, the start timing of the warning and deceleration control operation and the desired speed reduction of the deceleration control operation are properly determined in consideration of the integrated load that is imposed on the driver during the host vehicle traveling through the curve section of the curve. In accordance with the above-mentioned control, the adaptive cruise control system reduces the driver load with reliability by starting the warning and deceleration control operation at a proper timing and achieving a proper speed reduction. Even in case the path radius of a curve varies rapidly or largely along the curve section, or in case the length of a curve section is large, the adaptive cruise control system reduces the driver load with reliability.

In addition, the adaptive cruise control system of the first embodiment determines estimated total driver load TWL based on estimated lateral acceleration Ygen that is imposed during the host vehicle traveling through the curve section. Estimated lateral acceleration Ygen indicates an instantaneous force actually imposed on the host vehicle or the driver. Accordingly, estimated total driver load TWL is determined based on the force or acceleration actually imposed on the driver. This allows to properly determine estimated total driver load TWL, and thereby to determine the start timing of the warning and deceleration control operation and the desired speed reduction.

Furthermore, the adaptive cruise control system of the first embodiment determines the start timing of the warning and deceleration control operation and the desired speed reduction in accordance with estimated total driver load TWL that is obtained by integrating the instantaneous driver load. This integration enhances robustness against disturbance with respect to a method only based on information about the point of minimum path radius of a curve. With this method based on the single information, if the node information of the point of minimum path radius includes errors, for example, if the road map data stored in navigation system 20 includes errors, it is possible that the errors directly and largely influence the control operation of the system. However, the adaptive cruise control system of the shown embodiment uses the whole information about a curve, namely, the node information of a plurality of nodes in the curve section of a curve. Accordingly, even if there is errors in the node information of some of the nodes, the errors exert little influence upon the control operation of the system. Therefore, the adaptive cruise control system of the embodiment performs the warning and deceleration control operation with robustness against disturbance.

Furthermore, the adaptive cruise control system of the first embodiment performs the deceleration control operation when estimated total driver load TWL is larger than a threshold value which is determined based on deceleration threshold total driver load TWLcnt and reference total driver load TWLs. Thus, estimated total driver load TWL is controlled in accordance with reference total driver load TWLs so that the host vehicle travels stably through the curve section. Accordingly, the host vehicle speed is reduced toward an allowable cornering speed, so as not to impose a large load on a driver, in consideration of the length and shape of the curve section. More specifically, the adaptive cruise control system of the shown embodiment calculates driver load deviation ΔTWL between estimated total driver load TWL and reference total driver load TWLs, calculates desired deceleration Xgs based on the difference between driver load deviation ΔTWL and deceleration threshold total driver load TWLcnt, and performs the deceleration control operation so that driver load deviation ΔTWL varies to be same as deceleration threshold total driver load TWLcnt.

Accordingly, the system reduces the host vehicle speed toward an allowable cornering speed corresponding to a curve, so as not to impose a large load on a driver, in consideration of the length of the curve section, only when it is determined that the host vehicle is traveling too fast to stably travel through the curve section with no large load imposed on a driver. Naturally, estimated total driver load TWL tends to increase with increasing length of the curve section of a curve. If an adaptive cruise control system is configured to control estimated total driver load TWL to be smaller than a fixed threshold value, it is possible that the system generates undue deceleration due to the fact that the length of the curve section is large. However, the adaptive cruise control system of the shown embodiment determines reference total driver load TWLs in consideration of the length of the curve section, and controls estimated total driver load TWL to be smaller than or equal to reference total driver load TWLs, so as not to generate undue deceleration. In addition, desired deceleration Xgs is determined so as to be smaller than or equal to deceleration limit Xgs0. This prevents the system from generating too large a deceleration in the deceleration control operation.

In the shown embodiment, total driver load TWL is estimated based on estimated lateral acceleration Ygen, as mentioned above. However, it is optional to estimate a yaw rate of the host vehicle as a dynamic quantity indicative of the driver load in the curve section, which the host vehicle is traveling through the curve section, and to estimate total driver load TWL based on the estimated yaw rate. The yaw rate may be estimated based on vehicle speed V and path radius Rn (estimated yaw rate $\phi e = V/|Rn|$).

Figure 8A:
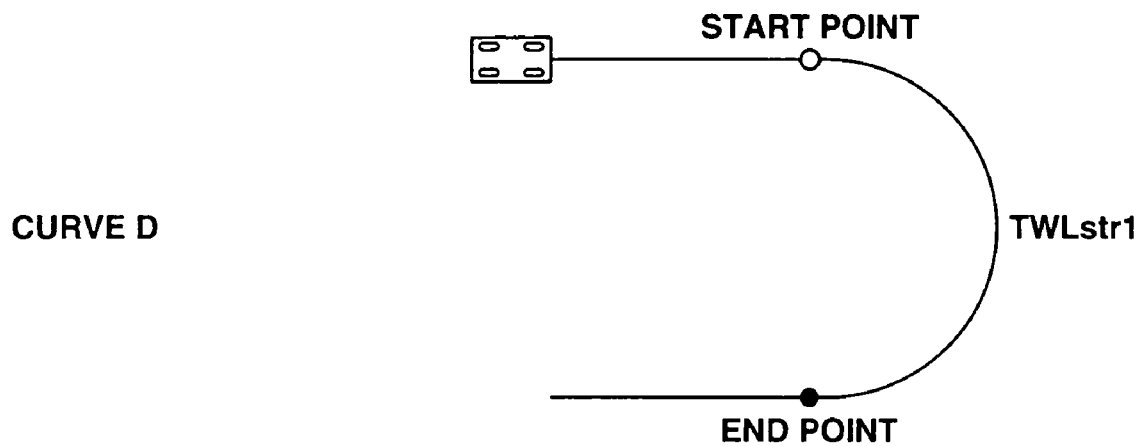
FIG. 8A is a diagram depicting a case in which the host vehicle is traveling through a curve D.
Figure 8B:
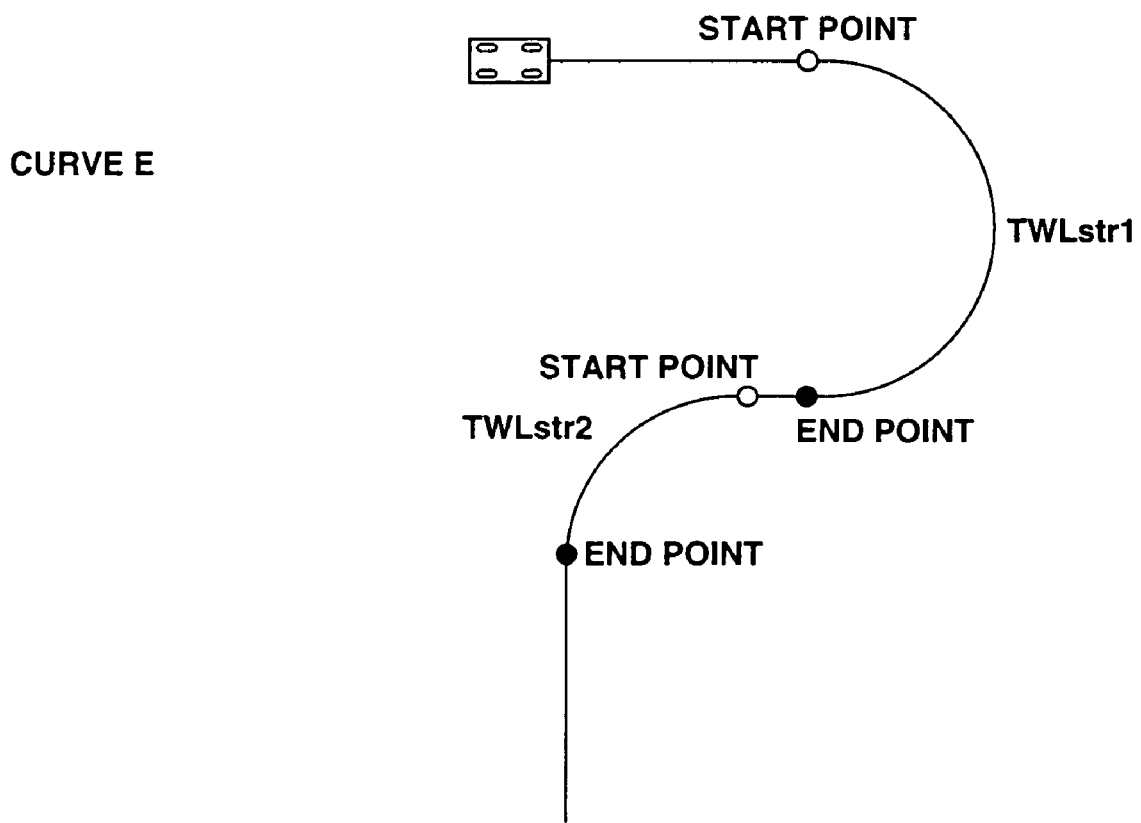
FIG. 8B is a diagram depicting a case in which the host vehicle is traveling through a curve E.

Referring now to FIGS. 7 through 8B, there is shown a second embodiment of the present invention. The adaptive cruise control system of the second embodiment is same as the system of the first embodiment, except in the routine programmed and executed in control unit 8. If an element of the system of the second embodiment is identical to one of the elements of the system of the first embodiment, the element is given a same reference sign as the identical element of the first embodiment. FIG. 7 is a flow chart depicting a routine of a control operation of the adaptive cruise control system. The routine of FIG. 7 is repeatedly executed by control unit 8 at intervals of processing time interval ΔT, called by timer interrupt. In FIG. 7, steps S1 through S4 are same as in the first embodiment. Identifying curve sections at step S4, the routine proceeds to step S4a.

At step S4a, control unit 8 determines whether or not the forward curve includes a series of curve sections. The determination is based on the locations of the points of minimum path radius. When control unit 8 detects a plurality of curve sections in the preview section, control unit 8 calculates a distance LM from a first point of minimum path radius nearest to the host vehicle to a second point of minimum path radius second nearest to the host vehicle. Control unit 8 determines that the curve includes a series of curve sections, when distance LM is smaller than or equal to a predetermined threshold distance LMs. Threshold distance LMs is a constant value.

In the case of FIG. 3, the first point of minimum path radius is node N6 which is a point of minimum path radius nearest to the host vehicle, and the second point of minimum path radius is node N12 which is a point of minimum path radius second nearest to the host vehicle. Distance LM is the distance from node N6 to node N12. When distance LM is smaller than or equal to threshold distance LMs, control unit 8 determines that the first curve section from node N3 to N9 and the second curve section from node N11 to node N15 are in series. When it is determined that the curve includes a series of curve sections, control unit 8 sets a curve succession flag Fr to "ON". Conversely, when it is determined that the curve does not include a series of curve sections, control unit 8 sets curve succession flag Fr to "OFF".

Alternatively, the determination whether a curve includes a series of curve sections may be implemented by considering vehicle speed V of the host vehicle. Actually, it may be determined that the curve includes a series of curve sections when the following equation (10) is satisfied.

$$LM/V \leq Tms \quad (10)$$

where Tms represents a predetermined and fixed threshold value. The left-side term (LM/V) indicates a time period between the two points of minimum path radius, serving as a determinant factor. Accordingly, when the time period is smaller than or equal to threshold time period Tms, it is determined that the curve includes a series of curve sections. Subsequent to step S4a, at step S5, control unit 8 determines road friction coefficient Kµ, as in the first embodiment.

Subsequent to step S5, at step S21, control unit 8 determines an estimated steering wheel torque Tstr that is required at each node during the host vehicle traveling at vehicle speed V. Steering wheel torque Tstr is a dynamic quantity indicative of the driver load in the curve section. Actually, steering wheel torque Tstr is calculated using the following equation (11) based on vehicle speed V and path radius Rn of each node.

$$Tstr = Kstr \cdot (V^2/|Rn|) \quad (11)$$

where Kstr is a constant factor which is determined in accordance with the specification or the dynamic characteristic of the host vehicle. However, it is optional to change factor Kstr in accordance with the characteristics of the tires and the suspension system, and in accordance with an estimated vehicle lateral acceleration. The vehicle lateral acceleration may be estimated as in the first embodiment.

Subsequent to step S21, at step S22, control unit 8 determines an estimated total driver load TWLstr imposed on a driver during the host vehicle traveling through a curve section of the curve. Estimated total driver load TWLstr is determined based on steering wheel torque Tstr, distance Ldn, and vehicle speed V. When curve succession flag Fr is "OFF", in other words, when the curve includes no series of curve sections, estimated total driver load TWLstr is calculated by integrating steering wheel torque Tstr from the start point to the end point of the curve section, using the following equation (12).

$$TWLstr = \Sigma\{Tstr \cdot (Ld(n+1)/V)\} \quad (12)$$

where Σ represents a sum from the start point of the curve section to the point prior to the end point of the curve section. This calculation is based on approximation that the steering wheel torque at node N is constantly applied from node N to node N+1. However, alternatively, the steering wheel torque between nodes may be interpolated and used to calculate estimated total driver load TWLstr.

Conversely, when curve succession flag Fr is "ON", namely, when the curve includes a series of curve sections, first, estimated total driver load TWLstr is calculated for each of the curve sections as in the above-mentioned case in which the curve includes no series of curve sections. Thus, control unit 8 calculates an estimated total driver load TWLstr1 for the first curve section, and an estimated total driver load TWLstr2 for the second curve section. Then, an estimated total driver load TWLsum is defined as a sum of estimated total driver load TWLstr1 and estimated total driver load TWLstr2. Potential load imposed during the host vehicle traveling between the first and second curve sections are not taken into account in the shown embodiment. Thus, steering wheel torque Tstr is integrated over the series of curve sections when there is a series of upcoming curve sections.

It is optional to define estimated total driver load TWLsum by adjusting or varying weights of the first and second curve section. That is, estimated total driver load TWLsum is calculated using the following equation (13).

$$TWLsum = Kc \cdot TWLstr1 + (1-Kc) \cdot TWLstr2 \quad (13)$$

where Kc represents a weight factor (0<Kc<1). For example, weight factor Kc may be set larger than 0.5, on the assumption that the first curve section is more significant than the second because the host vehicle is traveling through the first curve section in advance of the second curve section.

Subsequent to step S22, at step S23, control unit 8 determines a reference total driver load TWLstrs. Reference total driver load TWLstrs represents a total load which is applied to the driver during the host vehicle traveling at a speed that the host vehicle can stably travel through the curve section. In the shown embodiment, reference total driver load TWLstrs is calculated using the following equation (14).

$$TWLstrs = K\mu \cdot Tstrnol \cdot (LD/V) \quad (14)$$

where LD represents the length of the curve section, and Tstrnol is a typical value of the required steering torque such as 20 [N].

Subsequent to step S23, the routine proceeds to step S24. Steps S24 through S29 are the same as steps S9 through S14 of the first embodiment, when estimated total driver load TWL is replaced with estimated total driver load TWLsum, and reference total driver load TWLs is replaced with reference total driver load TWLstrs. At step S29, control unit 8 issues a control signal to hydraulic modulator 7 to generate desired wheel brake cylinder pressure Psfl to Psrr which are calculated at step 527, and a control signal to driving torque control unit 12 to generate desired driving torque Trq which is calculated at step 528. When driver load deviation ΔTWL is larger than warning threshold driver load TWLwr, control unit 8 operates warning system 23 to inform the driver of excess speed for a curve section, and to display or warn the driver of the start of the deceleration control operation. When driver load deviation ΔTWL is larger than warning threshold driver load TWLwr, control unit 8 operates warning system 23 to inform the driver that the host vehicle is about to enter an upcoming curve at too high a speed, and to display or warn the driver of the start of the deceleration control operation in advance. The warning operation is determined in accordance with curve succession flag Fr. More specifically, when curve succession flag Fr is "OFF", control unit 8 presents a voice message "A curve is ahead". Conversely, when curve succession flag Fr is "ON", control unit 8 presents a voice message "A series of curves are ahead". Alternatively, the voice massages may be replaced by any other warning messages capable of informing a driver of a series of curve sections. When driver load deviation ΔTWL is brought to be smaller than warning threshold driver load TWLwr, or when deceleration flag Fok is brought to be "ON", control unit 8 terminates the warning operation of warning system 23. Subsequent to step S29, the routine returns. As the whole routine of FIG. 7 which is called by timer interrupt is completed as mentioned above, the routine returns to the main program of control unit 8.

The following describes operations and behaviors of the adaptive cruise control system configured as described above in accordance with the second embodiment of the present invention. FIG. 8A shows a curve D including a single curve section. In the case of curve D, the curve section is identified or determined in accordance with the path radiuses of nodes, as in the first embodiment. Curve succession flag Fr is set to "OFF" because there is a single point of minimum path radius in the preview section. Accordingly, estimated total driver load TWLsum is equal to estimated total driver load TWLstr1 of the curve section. Reference estimated total driver load TWLstrs is determined in accordance with the length of the curve section. The adaptive cruise control system performs the warning and deceleration control operation in accordance with driver load deviation ΔTWL between reference total driver load TWLstrs and estimated total driver load TWLsum. Estimated total driver load TWLsum is calculated based on estimated required steering wheel torque Tstr that is imposed during the host vehicle traveling through the curve section. Estimated required steering wheel torque Tstr indicates an instantaneous load actually imposed on the host vehicle or the driver. Accordingly, estimated total driver load TWLsum is determined based on the load actually imposed on the driver. This allows to properly determine estimated total driver load TWLsum, and thereby to determine the start timing of the warning and deceleration control operation and the desired speed reduction, so that the driver does not think that the produced vehicle speed reduction is inadequate or the start timing of the warning operation is late, as in the first embodiment.

FIG. 8B shows a curve E including a series of curve sections. In this case, the adaptive cruise control system detects a first curve section and a second curve section, and identifies or determines the points of minimum path radius. When distance LM between the points of minimum path radius is smaller than or equal to threshold distance LMs, it is determined that the curve sections are in series. Accordingly, curve succession flag Fr is set to "ON". Estimated total driver load TWLsum is set to a sum of estimated total driver load TWLstr1 and estimated total driver load TWLstr2. Reference total driver load TWLstrs is set to a total typical load imposed on a driver during the host vehicle traveling from the start point of the first curve section to the end point of the second curve section. The system determines whether to perform the warning and deceleration control operation, and determines the start timing and the desired vehicle speed reduction of the warning and deceleration control operation, in accordance with estimated total driver load TWLsum.

With an adaptive cruise control system that performs a warning and deceleration control operation based on node information only about a point of minimum path radius as a reference, when the curve includes a series of curve sections as shown in FIG. 8B, the driver may be imposed on with no large load during the host vehicle traveling through the first curve section. However, during the host vehicle traveling through the second curve section, the vehicle speed may be larger than an estimated maximum allowable cornering speed, so that it is possible that the driver must perform braking operation and operate the steering wheel largely.

On the other hand, in case the curve includes a series of curve sections, the adaptive cruise control system of the second embodiment calculates estimated total driver load TWLsum which is imposed on a driver during the host vehicle traveling through the overall curve, and determines the timing and the speed reduction of the warning and deceleration control operation in accordance with estimated total driver load TWLsum. Accordingly, even when a curve includes a series of curve sections, the adaptive cruise control system properly controls the timing and the desired vehicle speed reduction of the warning and deceleration control operation, so that a driver does not feel that the start timing of the warning and dynamics control is late, or that the produced vehicle speed reduction is inadequate.

In the second embodiment, the adaptive cruise control system is configured to estimate a steering wheel torque that is required during the host vehicle traveling through a curve, and to estimate the driver load based on the estimated required steering wheel torque. This allows to properly or accurately determine the estimated driver load. However, it is optional to estimate an operating displacement of the steering wheel as is a dynamic quantity indicative of the driver load in the curve section, which is required during the host vehicle traveling through a curve, and to estimate the driver load based on the estimated required steering operating displacement. Furthermore, it is optional to estimate the yaw rate and/or the lateral acceleration of the host vehicle that are imposed on the host vehicle during the host vehicle traveling through a curve, and to estimate the driver load based on the estimated yaw rate and/or lateral acceleration.

Referring now to FIG. 9, there is shown a third embodiment of the present invention. The adaptive cruise control system of the third embodiment is same as the system of the first embodiment, except in the routine programmed and executed in control unit 8. If an element of the system of the second embodiment is identical to one of the elements of the system of the first embodiment, the element is given a same reference sign as the identical element of the first embodiment. FIG. 9 is a flow chart depicting a routine of a control operation of the adaptive cruise control system. The routine of FIG. 9 is repeatedly executed by control unit 8 at intervals of processing time interval ΔT, called by timer interrupt. In FIG. 9, steps S1 through S4 are same as in the first embodiment. Determining the road friction coefficient at step S5, the routine proceeds to step S31. At step S31, control unit 8 determines or selects a target node from the nodes in the curve section. In the third embodiment, the target node is defined or determined to be the point of minimum path radius which is identified at step S3.

Subsequent to step S31, at step S32, control unit 8 determines a maximum allowable lateral acceleration Yglim. Maximum allowable lateral acceleration Yglim is calculated using the following equation (15) based on road friction coefficient Kμ which is determined at step S5.

$$Yglim = Ks \cdot K\mu \tag{15}$$

where Ks represents a maximum allowable lateral acceleration factor having a value such as 0.8 G. Maximum allowable lateral acceleration factor Ks may be a fixed value or a variable value which is changed in accordance with vehicle speed V as shown in FIG. 10.

Figure 10:
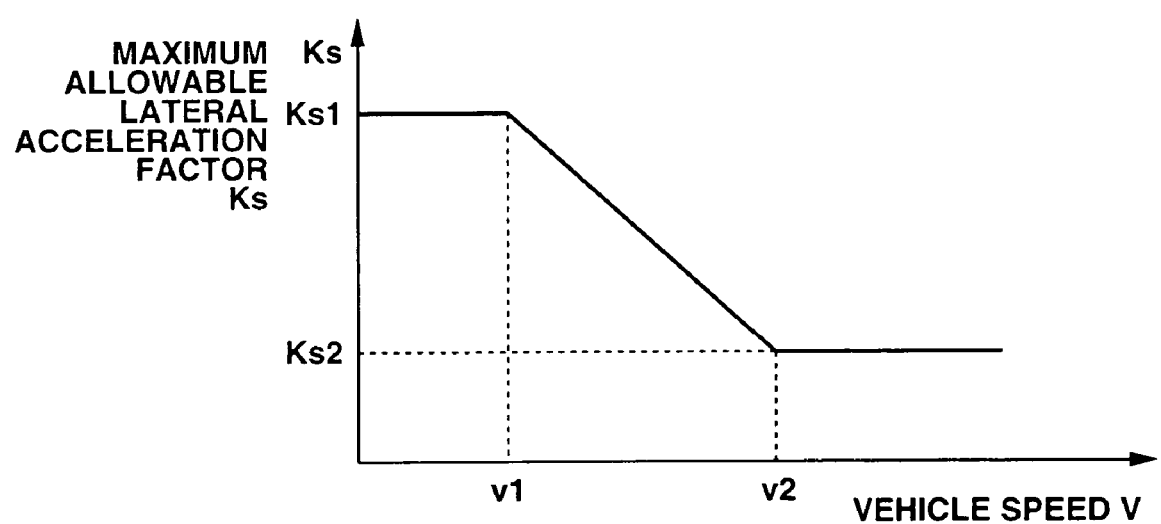
FIG. 10 is a diagram depicting a characteristic map for use to determine a maximum allowable lateral acceleration factor Ks at step S32 in FIG. 9.

The diagram of FIG. 10 includes a horizontal axis of vehicle speed V, and a vertical axis of maximum allowable lateral acceleration factor Ks. Maximum allowable lateral acceleration factor Ks is set to a relatively large value Ks1 when vehicle speed V is smaller than or equal to a predetermined relatively small first threshold value v1. When vehicle speed V is larger than first threshold value v1, maximum allowable lateral acceleration factor Ks decreases with increasing vehicle speed. When vehicle speed V is larger than a predetermined second threshold value v2 larger than first threshold value v1, maximum allowable lateral acceleration factor Ks is set to a predetermined value Ks2 smaller than value Ks1.

Subsequent to step S32, at step S33, control unit 8 determines desired deceleration Xgs. Desired deceleration Xgs is calculated using the following equation (16) based on vehicle speed V, a path radius Rn of the target node, and a distance Ln between the host vehicle and the target node.

$$Xgs = (V^2 - Vr^2)/(2Ln) \qquad (16)$$
$$= (V^2 - Yglim \cdot |Rn|)/(2Ln)$$

where Vr represents a desired vehicle speed at the target node. When desired deceleration Xgs is a positive value, desired deceleration Xgs indicates deceleration of the vehicle, or speed reduction of the vehicle.

Subsequent to step S33, at step S34, estimated lateral acceleration Ygen is determined, as at step S6 of the first embodiment. Subsequent to step S34, at step S35, estimated total driver load TWL is determined, as at step S7 of the first embodiment. Subsequent to step S35, at step S36, reference total driver load TWLs is determined, as at step S8 of the first embodiment. Subsequent to step S36, at step S37, deceleration flag Fok is set, as at step S10 of the first embodiment.

Subsequent to step S37, at step S38, control unit 8 adjusts desired deceleration Xgs based on driver load deviation ΔTWL between estimated total driver load TWL and reference total driver load TWLs. Actually, the adjustment ΔXgs is calculated using the following equation (17).

$$\Delta Xgs = \min\{Kg \cdot (\Delta TWL - TWLcnt), \Delta Xgs0\} \qquad (17)$$

where min{ } represents a function of selecting a minimum among a list of arguments inside the parentheses { }. ΔXgs0 is a predetermined and fixed value used to limit desired deceleration Xgs.

When deceleration flag Fok is "OFF", an adjusted desired deceleration Xgsh is calculated using the following equation (18).

$$Xgsh = \min(Xgs + \Delta Xgs, Xgs0) \qquad (18)$$

where Xgs0 is an upper limit of adjusted desired deceleration Xgsh, which is a fixed value predetermined in accordance with the reliability of navigation system 20 such as 0.3 G. Conversely, when deceleration flag Fok is "ON", adjusted desired deceleration Xgsh is set to zero. Thus, desired deceleration Xgs is adjusted by adding adjustment ΔXgs, in the shown embodiment. However, it is optional to calculate an adjustment gain by subtracting deceleration threshold total driver load TWLcnt from driver load deviation ΔTWL, and to multiply the adjustment gain and desired deceleration Xgs to produce an adjusted desired deceleration Xgs.

Subsequent to step S38, at step S39, control unit 8 determines whether to perform the warning operation. More specifically, the determination is performed in accordance with adjusted desired deceleration Xgsh. When deceleration flag Fok is "OFF" and warning flag Fw is "OFF", control unit 8 determines to perform the warning operation if the following equation (19) is satisfied.

$$Xgsh \geq Xgsw \qquad (19)$$

where Xgsw represents a threshold value to determine whether to perform the warning operation, which is a fixed value such as 0.08 G. On the other hand, when deceleration flag Fok is "OFF" and warning flag Fw is "ON", control unit 8 determines to perform the warning operation if the following equation (20) is satisfied.

$$Xgsh \geq Xgsw - Khw \qquad (20)$$

where Khw represents a control hysteresis used to prevent hunting of the on/off state of the waning operation, which is a fixed value such as 0.03 G. When deceleration flag Fok is "ON", control unit 8 determines not to perform the warning operation, in other words, inhibits the warning operation. Warning flag Fw is set to "ON", when the equation (19) or the equation (20) is satisfied. Conversely, when both of the equations (19) and (20) are unsatisfied, or when deceleration flag Fok is "ON", warning flag Fw is set to "OFF".

Subsequent to step S39, at step S40, the desired wheel brake cylinder pressures corresponding to adjusted desired deceleration Xgsh are calculated as at step S12 of the first embodiment. Subsequent to step S40, at step S41, the desired driving torque is determined as at step S13 of the first embodiment.

Subsequent to step S41, at step S42, control unit 8 issues a control signal to hydraulic modulator 7 to generate desired wheel brake cylinder pressure Psfl to Psrr which are calculated at step S40, and a control signal to driving torque control unit 12 to generate desired driving torque Trq which is calculated at step S41. When warning flag Fw is "ON", control unit 8 operates warning system 23 to inform the driver that the host vehicle is about to enter an upcoming curve at too high a speed, and to display or warn the driver of the start of the deceleration control operation in advance. When warning flag Fw is "OFF", control unit 8 terminates the warning operation of warning system 23. Subsequent to step S42, the routine returns. As the whole routine of FIG. 9 which is called by timer interrupt is completed as mentioned above, the routine returns to the main program of control unit 8.

As mentioned above, the adaptive cruise control system of the third embodiment is configured to determine the target node to be the point of minimum path radius which is most significant in terms of influence on cornering behavior of the host vehicle, to determine maximum allowable lateral acceleration Yglim in consideration of road friction coefficient Kμ, to determine desired deceleration Xgs so that the vehicle lateral acceleration at the target node varies to be maximum allowable lateral acceleration Yglim, to produce adjusted desired deceleration Xgsh by adding desired deceleration Xgs and adjustment ΔXgs so that the driver load is smaller than a threshold value, and to perform the deceleration control operation at a deceleration of adjusted desired deceleration Xgsh. Therefore, the adaptive cruise control system of the third embodiment reduces the host vehicle speed that is used at the target node to an allowable cornering speed so that the host vehicle travels stably in the curve section, and reduces the driver load that is imposed during the host vehicle traveling through the curve. Thus, the adaptive cruise control system of the third embodiment achieves both proper reduction of the driver load and proper reduction of the host vehicle speed. The adaptive cruise control system of the third embodiment properly controls the vehicle dynamics at a proper timing and with a proper amount of operation, so that a driver does not feel uncomfortable about the warning and deceleration control operation.

The adaptive cruise control system of the third embodiment is configured by modifying the system of the first embodiment. However, the features of the third embodiment are applicable to the adaptive cruise control system of the second embodiment. In the shown embodiments, the required deceleration for the control operation is implemented by generating the braking torque and/or decreasing the driving torque. However, in order to implement the required deceleration, it is optional to employ at least one, namely, one or a combination, of reducing the driving torque (or the engine torque or the driving force), shifting the gear ratio of the transmission, increasing the braking torque (or the braking force) by pressurizing the brake apply pressure.

In the above-mentioned embodiments, the adaptive cruise control system estimates in accordance with the vehicle future trajectory and the vehicle driving state a future driver load imposed on a driver of the vehicle during the vehicle traveling through a target section of the vehicle future trajectory, and changes the vehicle operating condition in accordance with the estimated future driver load, so that the future driver load decreases. This properly adjusts the driver load imposed during the vehicle traveling through the curve, so that the driver does not feel uncomfortable in cornering.

This application is based on a prior Japanese Patent Application No. 2004-128340 filed on Apr. 23, 2004. The entire contents of this Japanese Patent Application No. 2004-128340 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An adaptive cruise control system for an automotive vehicle, comprising:
   a trajectory determination section to collect trajectory information used to determine a future trajectory of the vehicle;
   a driving state determination section to collect vehicle information used to determine a driving state of the vehicle;
   an output section to change an operating condition of the vehicle; and
   a control unit in operative communication with the trajectory determination section, the driving state determination section, and the output section, the control unit being configured to perform the following:
   determining the vehicle future trajectory;
   determining the vehicle driving state;
   estimating in accordance with the vehicle future trajectory and the vehicle driving state a future driver load imposed on a driver of the vehicle during the vehicle traveling through a target section of the vehicle future trajectory; and
   changing the vehicle operating condition in accordance with the estimated future driver load, so that the future driver load decreases.

2. The adaptive cruise control system as claimed in claim 1, wherein the output section comprises a warning system to provide a warning to the driver, and wherein the control unit is configured to issue the warning in accordance with the estimated future driver load.

3. The adaptive cruise control system as claimed in claim 1, wherein the output section comprises an actuator to change a dynamic condition of the vehicle, and wherein the control unit is configured to control the vehicle dynamic condition in accordance with the estimated future driver load, so that the future driver load decreases.

4. The adaptive cruise control system as claimed in claim 3, wherein the output section comprises a warning system to provide a warning to the driver, and wherein the control unit is configured to issue the warning in advance of the operation of controlling the vehicle dynamic condition.

5. The adaptive cruise control system as claimed in claim 3, wherein the control unit is configured to reduce a speed of the vehicle in accordance with the estimated future driver load, so that the future driver load decreases.

6. The adaptive cruise control system as claimed in claim 1, wherein the control unit is configured to perform the following:
   identifying an upcoming curve section as a target section;
   estimating a dynamic quantity indicative of the driver load in the curve section;
   integrating the estimated dynamic quantity; and
   estimating the future driver load in accordance with the integrated dynamic quantity.

7. The adaptive cruise control system as claimed in claim 6, wherein the control unit is configured to perform the following:
   integrating the estimated dynamic quantity from a start point of the curve section to an end point of the curve section; and
   estimating the future driver load in accordance with the integrated dynamic quantity.

8. The adaptive cruise control system as claimed in claim 6, wherein the control unit is configured to perform the following:
   integrating the estimated dynamic quantity from a start point of the curve section to a point of minimum radius of curvature of the curve section; and
   estimating the future driver load in accordance with the integrated dynamic quantity.

9. The adaptive cruise control system as claimed in claim 6, wherein the dynamic quantity is a lateral acceleration of the vehicle.

10. The adaptive cruise control system as claimed in claim 6, wherein the dynamic quantity is a yaw rate of the vehicle.

11. The adaptive cruise control system as claimed in claim 6, wherein the dynamic quantity is a required steering wheel angular displacement.

12. The adaptive cruise control system as claimed in claim 6, wherein the dynamic quantity is a required steering wheel torque.

13. The adaptive cruise control system as claimed in claim 6, wherein the control unit is configured to perform the following:
   determining whether or not a difference between the integrated dynamic quantity and a reference value is larger than a threshold value; and
   changing the vehicle operating condition in accordance with the estimated future driver load, so that the future driver load decreases, when the difference is larger than the threshold value.

14. The adaptive cruise control system as claimed in claim 13, wherein the control unit is configured to determine the reference value is determined by integrating a predetermined constant value.

15. The adaptive cruise control system as claimed in claim 6, wherein the control unit is configured to perform the following:
   determining whether or not there is a series of upcoming curve sections; and integrating the estimated dynamic quantity over the series of curve sections when there is a series of upcoming curve sections.

16. The adaptive cruise control system as claimed in claim 15, wherein the control unit is configured to determine that there is a series of upcoming curve sections, in accordance with a distance between a first point of minimum radius of curvature of a first one of the curve sections and a second point of minimum radius of curvature of a second one of the curve sections.

17. The adaptive cruise control system as claimed in claim 15, wherein the control unit is configured to determine the integrated dynamic quantity by varying weights between a first one of the curve sections and a second one of the curve sections which follows the first curve section.

18. The adaptive cruise control system as claimed in claim 17, wherein the weight of the first curve section is larger than that of the second curve section.

19. The adaptive cruise control system as claimed in claim 6, wherein the control unit is configured to reduce a speed of the vehicle in accordance with the estimated future driver load, so that the future driver load decreases.

20. The adaptive cruise control system as claimed in claim 19, wherein the control unit is configured to reduce a speed of the vehicle in accordance with the estimated future driver load, so that the future driver load decreases to be smaller than or equal to a reference value.

21. The adaptive cruise control system as claimed in claim 19, wherein the control unit is configured to perform the following:
  determining a desired deceleration of the vehicle in accordance with a difference between the estimated future driver load and a reference value; and
  reducing the vehicle speed in accordance with the desired deceleration.

22. The adaptive cruise control system as claimed in claim 19, wherein the vehicle driving state includes a speed of the vehicle, and wherein the control unit is configured to perform the following:
  determining a point of minimum radius of curvature of the curve section in accordance with the vehicle future trajectory;
  determining a desired deceleration of the vehicle in accordance with a distance between the point of minimum radius of curvature of the curve section and the vehicle, and the vehicle speed;
  adjusting the desired vehicle deceleration in accordance with the estimated future driver load; and
  reducing the vehicle speed in accordance with the adjusted desired deceleration.

23. The adaptive cruise control system as claimed in claim 19, wherein the vehicle speed reduction is implemented by at least one of reducing a driving force imposed on the vehicle, shifting a gear ratio of a transmission of the vehicle, and increasing a braking force imposed on the vehicle.

24. The adaptive cruise control system as claimed in claim 1, wherein the trajectory determination section comprises a vehicle location determination section to determine a location of the vehicle, and a memory to store road map information, and wherein the vehicle location and the road map information are used to determine the vehicle future trajectory.

25. The adaptive cruise control system as claimed in claim 1, wherein the trajectory determination section comprises a receiver to receive the trajectory information which is externally input from infrastructural equipment.

26. An adaptive cruise control system for an automotive vehicle, comprising:
  trajectory determination means for collecting trajectory information used to determine a future trajectory of the vehicle;
  driving state determination means for collecting vehicle information used to determine a driving state of the vehicle;
  output means for changing an operating condition of the vehicle; and
  control means in operative communication with the trajectory determination means, the driving state determination means, and the output means, for performing the following:
    determining the vehicle future trajectory;
    determining the vehicle driving state;
    estimating in accordance with the vehicle future trajectory and the vehicle driving state a future driver load imposed on a driver of the vehicle during the vehicle traveling through a target section of the vehicle future trajectory; and
    changing the vehicle operating condition in accordance with the estimated future driver load, so that the future driver load decreases.

27. A method of controlling an automotive vehicle, comprising:
  determining a future trajectory of the vehicle;
  determining a driving state of the vehicle;
  estimating in accordance with the vehicle future trajectory and the vehicle driving state a future driver load imposed on a driver of the vehicle during the vehicle traveling through a target section of the vehicle future trajectory; and
  changing an operating condition of the vehicle in accordance with the estimated future driver load, so that the future driver load decreases.

* * * * *